US007032186B1

(12) United States Patent
Gasser et al.

(10) Patent No.: US 7,032,186 B1
(45) Date of Patent: Apr. 18, 2006

(54) METHODS AND APPARATUS FOR REPRESENTING RESOURCES IN A COMPUTING SYSTEM ENVIRONMENT

(75) Inventors: Morrie Gasser, Hopkinton, MA (US); Clifford E. Kahn, Lexington, MA (US)

(73) Assignee: EMC Corporation, Hopkinton, MA (US)

( * ) Notice: Subject to any disclaimer, the term of this patent is extended or adjusted under 35 U.S.C. 154(b) by 588 days.

(21) Appl. No.: 09/966,475

(22) Filed: Sep. 28, 2001

(51) Int. Cl.
*G06F 3/00* (2006.01)
*G06F 9/00* (2006.01)
*G06F 17/00* (2006.01)
(52) U.S. Cl. ................ 715/853; 715/854; 707/102
(58) Field of Classification Search ........... 345/853; 707/102; 715/854
See application file for complete search history.

(56) References Cited

U.S. PATENT DOCUMENTS

| 5,923,328 | A | * | 7/1999 | Griesmer ............... 715/854 |
| 6,028,602 | A | | 2/2000 | Weidenfeller et al. ...... 345/340 |
| 6,189,012 | B1 | | 2/2001 | Mital et al. ............. 707/103 |
| 6,370,538 | B1 | * | 4/2002 | Lamping et al. ........... 707/102 |

FOREIGN PATENT DOCUMENTS

WO   WO 01/79982 A2   10/2001

OTHER PUBLICATIONS

Windows NT screen shots, 1998.*
Morrie Gasser, Hanna Yehuda and Michael Patrick Bushe; Methods and Apparatus for Graphically Managing Resources; filed Sep. 28, 2001; Assigned to EMC Corporation.
Morrie Gasser; Methods and Apparatus for Presenting Information to a User of a Computer System; U.S. Appl. No.: 09/547,510; filed Apr. 12, 2000; Assigned to EMC Corporation.
European Search Report under Section 17; Application No. GB 0219742.4, dated Mar. 17, 2003, 1 Page.

* cited by examiner

*Primary Examiner*—Kristine Kincaid
*Assistant Examiner*—Boris Pesin
(74) *Attorney, Agent, or Firm*—Barry W. Chapin, Esq.; Chapin & Huang, LLC

(57) ABSTRACT

A computer system and method provide a systems for representing resource(s) in a computing system environment by creating an object to represent a resource in the computing system environment and assigning an object identifier to the object. The object identifier includes at least a simple name of the object and a home of the object. The system displays at least one representation of the object on a graphical user interface. Each representation of the object includes the simple name of the object and, if a home condition exists for that representation of the object displayed on the graphical user interface, the representation further includes the home of the object, and if a home condition does not exist for that representation of the object, the representation of the object displayed on the graphical user interface does not include the home of the object. The graphical user interface can also provide groups that are transparent and terminal in order to allow visual arrangement of resource representations without effecting those resources.

30 Claims, 7 Drawing Sheets

METHODS AND APPARATUS FOR REPRESENTING RESOURCES IN A COMPUTING SYSTEM ENVIRONMENT

RELATED APPLICATIONS INCORPORATED BY REFERENCE

The present invention relates to co-pending United States Patent Application entitled "METHODS AND APPARATUS FOR GRAPHICALLY MANAGING RESOURCES", having Ser. No. 09/966,529, filed on the same day as the present Application. The present invention also relates to co-pending U.S. patent application Ser. No. 09/547,510 entitled "METHODS AND APPARATUS FOR PRESENTING INFORMATION TO A USER OF A COMPUTER SYSTEM", having filed on Apr. 12, 2000. These related Patent Applications are assigned to the assignee of the present invention. The entire teachings and contents of these reference Patent Applications are hereby incorporated by reference in their entirety.

FIELD OF THE INVENTION

The present invention generally relates to computer and software systems for managing resources in a computing and/or storage system environment, and more particularly, to mechanisms and techniques which provide representations of such resource via a graphical user interface.

BACKGROUND OF THE INVENTION

Many types of conventional computing systems operate software programs that include a graphical user interface (GUI) that allows a user of the computing system to graphically view, manage, control and/or configure various types of hardware or software resources in an environment in which the computing system operates. The graphical user interface may allow, for example, a user of the computing system to interact with the computing system and its associated software applications, filesystem(s), data, devices and/or peripherals. The computing system may operate in a networked environment and the software program may be a network management application that provides the graphical user interface to allow the user to remotely manage and control other computing systems and/or resources that are remotely coupled via a network. Resources that may be graphically managed in this manner can include storage system and device resources such as disks, file systems, volumes and the like, network device resources such as switches, host computer system resources such as clients or servers, and software applications that operate on one or more of such components. A user views, manages, configures or otherwise operates on such resources via manipulation of a representation of the resources that the software application provides (e.g., displays or renders) on the graphical user interface.

Conventional resource management software applications (e.g., network or device manager software) typically provide a representation of each resource on the graphical user interface using a respective icon paired with a resource identifier. The icon provides a small graphical representation of the resource while the resource identifier is a text or character string name for the resource. The software application displays the resource identifier in a fully qualified manner. A fully qualified resource identifier conveys the naming scheme that the software or operating system imposes resources. For example, a fully qualified resource identifier may include a string a of alphanumeric characters (e.g., text and/or numbers) the indicates a specific file and path name for that file in a file system in order to uniquely identifies each resource.

In many computing system environments, resources have hierarchical relationships with other resources (e.g., files in a file system hierarchy). Due to such hierarchical relationships and in order to provide uniqueness for each resource identifier, a fully qualified resource identifier for a resource in a conventional resource management application includes a "hierarchy location" such as a pathname for the resource in the resource hierarchy (e.g., the directory or folder path of a file in a file system hierarchy) followed by the resource's "simple name," which is the name of the resource (e.g., the file name of the file in the file system). As an example, if the resource is a text file having a simple name "myfile.txt" and has the hierarchical file system location "/user/person/home/textfiles/," then a fully qualified resource identifier for this resource might appear as "user/person/home/textfiles/myfile.txt" in the graphical user interface.

Conventional resource management applications that include graphical user interfaces that display such naming schemes for resources typically allow the user to select or modify the simple name for a resource. For example, the user might be allowed to rename the file "myfile.txt" to "ourfile.txt." However, the resource management application typically automatically assigns the hierarchy location portion of the fully qualified resource identifier based upon where the resource is actually located in the resource hierarchy. A user can change the hierarchy location portion of a fully qualified resource identifier by either changing the name(s) of the directory(s) or folder(s) that make-up the hierarchy location of the resource in the resource hierarchy, or by actually moving the resource (e.g., the file) to a new location (e.g., a new directory) within the resource hierarchy.

The Windows series of operating systems (e.g., Windows 95, Windows 98, Windows NT, Windows 2000, collectively referred to herein as Windows), manufactured by Microsoft Corporation of Redmond Wash., U.S.A., provides a resource identification and naming scheme that operates in a manner similar to that described above. Windows 95, Windows 98, Windows NT and Windows 2000 are trademarks of Microsoft Corporation.

Generally, Windows provides access to computing system resources via a graphical representation of computing system resources called a desktop. The Windows desktop allows a user of the computer system, for example, to navigate and manage files within file systems contained within one or more storage devices (e.g., disks) associated with the computing system. Limited device management is also provided via the Windows desktop and associated Windows applications that provide graphical user interfaces for device management functions. One example of a software application included with Windows that provides such file system and device management capabilities via a graphical user interface is the Windows Explorer application program.

A user can use Windows Explorer to view and graphically navigate and manage certain resources associated with the computer system operating the Windows operating system. To do so, a left side of the graphical user interface within Windows Explorer provides a hierarchical and graphical representation of resources related to the computing system. For example, Windows Explorer can represent directories on disk(s) accessible to the computer system as a hierarchical arrangement of folder icons paired with a simple name of the directory corresponding to that folder. Each folder icon and simple name pair in the hierarchy directly corresponds to the directory on the disk having that simple name that contains files and/or other folders (i.e., subdirectories). A user can click or double-click a folder icon/simple name pair (hereinafter referred to as folder icon) in the hierarchy to open or close that folder.

In response to a user clicking a folder icon to "open" that folder in the hierarchy, Windows Explorer redisplays the folder icon in the hierarchy on the left side of the GUI to appear as an "open" folder icon and modifies the left-side hierarchy to include a display of any sub-folders icons and simple name pairs of sub-directories that exist hierarchically below or "within" the open folder. In addition, on the right side of the Windows Explorer graphical user interface, Windows Explorer displays resource identifiers for any files or folders that exist within the selected (i.e., the opened) folder in the hierarchy.

Some graphical user interfaces of software applications allow a user to control whether resource identifiers are shown using simple names or by using fully qualified resource identifiers. In some cases, if many resource identifiers must be shown, the graphical user interface can display the resource identifiers (fully qualified or with just the simple name) in an up/down scrollable list of resource identifiers. In addition, if the resources are displayed using their fully qualified resource identifier and the hierarchy location portion of a resource identifier (e.g., the path name of a file) contains many directory names, that fully qualified resource identifier might contain alphanumeric characters that extend in length beyond the bounds (e.g., the right most side) of a window in the graphical user interface. In other words, the entire combination of hierarchy location followed by the simple name of a file or directory or other resource might not be completely visible in the window. In such cases, the graphical user interface can also provide a right/ left scrollbar to allow the user to scroll the list of resource identifiers to the left to allow the user to view the simple name that follows the hierarchy location within the fully qualified resource identifier.

Many graphical user interface based applications such as Windows Explorer also allow a user to elect to arrange a list of icons/resource identifier pairs that the graphical user interface displays according to certain pre-defined views. For example, the user may elect to have a graphical user interface display icon/resource identifier pairs alphabetically, or by creation date, by size, by author, and so forth. If a user elects to arrange a view of icon/resource identifier pairs based on one of these attributes, Windows Explorer displays the sorted list of icons according to the user selected attribute (e.g., size, date, etc.) within the graphical user interface display.

Operating systems such as Windows and variants of Unix provide another graphical user interface feature that allows a user to create a "shortcut" or "alias" to a particular resource, such as a file or directory shortcut. A shortcut or alias is essentially a simple name placeholder or link that points back to the original copy of the file or directory within the file system. A user can provide a simple name to a shortcut or alias that is the same or that is different than the simple name of the original resource to which that shortcut or alias references. The user can then copy or move the shortcut or alias to another location in the file system. When a graphical user interface of the operatig system displays, for example, a resource identifier listing for a directory containing the shortcut or alias, the graphical user interface lists the user defined simple name for the shortcut or alias that references the actual resource (e.g., the real file or directory) which is located in another portion of the hierarchy of the file system.

SUMMARY OF THE INVENTION

Each of the aforementioned conventional techniques that provide representations of resources within a graphical user interfaces suffer from certain deficiencies and/or limitations. Such limitations are due in part to operational limitations of the conventional graphical user interfaces provided by those applications and in particular, to limitations in the ability of conventional graphical user interfaces to represent and name resources in a concise and flexible manner.

For example, the aforementioned conventional hierarchical naming scheme employed by typical conventional graphical user interface-based operating systems requires that a fully qualified resource identifier for a resource include the hierarchy location followed by the simple name of the resource. Such a naming scheme can make it difficult for a user to quickly discern the simple name assigned to the resource from the hierarchy location of the resource. This visual obscurity might result, for example, from many simple names of many resources (e.g., a list of files) appearing in different locations in a list of fully qualified resource identifiers each having a varying length. Consider, for example, when Windows Explorer displays a long list of files having path names that each indicate different locations of respective files in a file system. Since each path name (i.e., each hierarchy location) may be a different length, the simple names of each file (i.e., the file names) do not line up vertically with each other since each simple name is appended to the end of the resource identifier (i.e., after the hierarchy location or path name). This makes it difficult for a user to quickly perform a visual top to bottom scan of the resource identifier list in the graphical user interface to ascertain the simple name of each file. The user must look at the rightmost end of each resource identifier to discern each simple name, and since the resource identifiers are fully qualified and have different lengths, the user must look both vertically (e.g., down) and then horizontally either to the left or right to view the simple name of the next fully qualified resource identifier. This can become quite tiresome for a user of a conventional graphical user interface.

In addition, when a window in a conventional graphical user interface displays the fully qualified resource identifier for a resource, but that window is not large enough in the horizontal direction to completely display the entire alphanumeric string for the fully qualified resource identifier, the simple name of the resource might not be visible to the user of the graphical user interface. The user might have to operate the horizontal scroll bar in order to scroll the display to the left so that the simple name of the resource is visually apparent.

Since software applications must generally reference resources in a fully qualified manner, users must supply resource identifiers in a fully qualified format which requires that user to perform error-free entry (e.g., typing) of the complete hierarchy location such as a full path name followed by the correct simple name of a particular resource. This can become quite cumbersome when referencing many resources or only a single resource having a long hierarchy location.

If a user decides to use the alias or shortcut feature of a conventional operating system to provide an second identification of a resource in a location other than the true location of that resource with the hierarchy (e.g., with the file system), the alias or shortcut for that resource might not provide an indication of the true location of that resource which it references. In other words, if the user creates a shortcut and gives that shortcut a make like "myfile," the graphical user interface will not automatically indcate the true location of the file that corresponds to the myfile shortcut. To determine this information, the user might have to select the alias or shortcut and activate (e.g., via a right mouse click) a pull-down menu to select a "Properties" feature in order to determine the actual file system location of the resource referenced by the alias or shortcut. If multiple shortcuts have the same simple name, it may be unclear to the user which shortcut refers to which resource. In other words, by viewing the simple name of the alias or shortcut by itself, the user will not automatically be provided with true identity or location of the resource to which that alias or shortcut relates. If the user wants an alias to indicate the true identity of the resource to which that alias refers, then the user must manually name the alias or shortcut with an indication of the hierarchy location or resource identity. Since this process is not automated, inconsistencies in naming can result from one alias or shortcut to another and no warning is provided if the name the user selects is already in use by another resource.

In addition, conventional software applications and operating systems do not provide a sufficient mechanism to create a grouping or category for resources within a resource hierarchy such as a file system without having that grouping or category be included in the resource hierarchy location. For example, a user of a conventional operating system may create a sub-directory to hold files of a certain type. However, to reference those files, the user must supply that directory name as part of the path to the files. There is no technique in a conventional graphical user interface-based operating system to create a grouping directory for placement of files and then to reference those files without having to reference the grouping. In addition, directories or other grouping constructs provided by conventional software applications do not insulate resources located below that directory from user operations. For example, a user cannot place files into a directory, and then remove that directory, without removing the files. This is because conventional grouping techniques, such as creating directories to group files or other resources, force the directory to become part of the hierarchy location or pathname of the file or resource. There are no easy ways to create a grouping structure such as a directory within a conventional operating system but to have resource placed in that directory to be considered part of another directory instead.

These and other deficiencies common to conventional software and operating system naming schemes and resource referencing techniques can result in user errors since a user may perform an operation on a resource (e.g., deleting a file) without being fully aware of the identity of the resource. The user may thus accidentally reference an incorrect resource (e.g., as a result of a typographical error when entering a long resource identifier). To avoid such errors, users must continually be thinking about the naming scheme and hierarchical structure imposed upon resource identifiers so as to avoid accidentally referencing the wrong resource. In addition, if resource identifies are lengthy, user must provide significantly more manual graphical user interface operations (e.g., scrolling to identify simple names) to properly reference resources.

Conversely, embodiment of the present invention provide unique resource identification, naming, grouping and referencing techniques that an operating system and/or a software application using a graphical user into can employ to significantly overcome many of the problems of conventional graphical user interfaces used for management of resources in a computer system, data storage, or computer network environment. Preferred embodiments of the invention operate within a management station computer system such as a storage area network management station. Such a computer system can operate, for example, a resource management application that provides the graphical user interface and resource representation techniques and mechanisms as explained herein.

In particular, the system of the invention provides method embodiments which operate in a computer system having a memory system and a display that displays a graphical user interface for management of network resources. The method embodiments operate to represent one or more resources in a computing system environment. One such method embodiment comprises the steps of cap an object to represent a resource in the computing system environment. A user of the computer system may instruct the management software to create the object, or alternatively, the management station may be configured with software that can "discover" resources that are capable of being mane and can create objects for each discovered resource. The object that is created according to this method is generally an instantiation of a data s such as an instantiation of a Java or C++ class, that contains data definitions and methods that describe the resource that the object represents.

This method embodiment further comprises the step of assigning an object identifier to the object. The object identifier includes at least a simple name of the object and a home of the object. Generally, the entire object identifier (i.e., the simple name followed by the home of the object) represents a fully qualified resource identifier for the resource represented by the object. A user may assign the simple name to the object, or alternatively, the discover mechanism can automate the process of assigning the simple name to an object for example by using the serial number of the resource (e.g., the serial number of a data storage system) as the simple name. A graphical user interface operating in accordance with the embodiment of the invention will display the simple name assigned to an object uniquely for that object. Furthermore, a simple name for an object will be unique for that object in that object's home context. The home context of the object is defined by the home of the object within the resource identifier for the object. The home of the object represents or references another object (e.g., a parent object, as will be explained) in a set of objects (e.g., preferably an object hierarchy) to which the created object relates.

The method embodiment further includes the step of displaying at least one representation of the object on a graphical user interface. Each representation of the object including the simple name of the object. As will explained, even though an object hierarchy is used to hierarchically arrange objects in relation to other objects, a object can appear in more than one location in the object hierarchy. However, since each representation of the object in a graphical user interface includes at least the simple name of the object, then a user of the graphical user interface can immediately view the object hierarchy and can see, for each representation of each object, the simple name for that object.

In addition, in this method embodiment, if a home condition (to be explained) exists for one of the representations of the object(s) displayed on the graphical user interface, those representations of objects (for which a home condition exists) further include the home of the object. If a home condition does not exist for representation(s) of object(s) displayed on the graphical user interface, then those representation(s) do not include the home of the object. In other words, as representation of the object are displayed, rendered or otherwise provided on a graphical user interface operating according to this embodiment, if a home condition exists or occurs for a particular representation of an object on the graphical user interface, then that representation will include both the simple name and the home of the object, such that the representation is displayed on the graphical user interface in a fully qualified manner.

In another embodiment, the method includes the step of associating the object with at least one location within an object hierarchy such that the object becomes a child object of at least one parent object in the object hierarchy. The object hierarchy represents relationships between resources in the computing system environment which are represented by objects in the object hierarchy. Thus, an object hierarchy is formed (or inherently exists) by hierarchical relationships formed between each resource, and the object that represent those resources contain references (e.g., pointers or inheritances of classes of other objects) for those relationships. At least one location to which the object is associated in the object hierarchy includes a home location identifying a home object in object hierarchy under which the object is initially associated as a child object, so as to define a home context for the object. Thus, in one embodiment, the object is created within an object hierarchy and a child object from which that object descends from in the hierarchy becomes the home object of the newly created object. This home area (i.e., the level in the hierarchy in which the object is created) becomes the home context for this object. Since the simple name is unique in the home context, the simple name will uniquely identity this object its home context.

Thus, in preferred embodiments, a home condition exists for a representation of an object displayed on the graphical user interface if displaying that representation of the object at that location in an object hierarchy in the graphical user interface causes one of i) the object to be displayed out of a home context of the object and/or ii) the object to be displayed non-uniquely in a context in which the object is displayed. Accordingly, the occurrence of a home condition causes for a representation of the object causes that representation to be displayed in a qualified manner (i.e., including both the simple name and the home of the object) in that location in the object hierarchy in the graphical user interface.

This allows a user of the graphical user interface to know or understand the true identity of the object (i.e., its fully qualified identity) no matter where the representation of that object is displayed in the object hierarchy in the graphical user interface. Embodiments of the invention thus makes it intuitively obvious for a user to understand what an object name (i.e., its representation in the graphical user interface) means without having to learn hierarchical naming schemes or pathname structures and avoids requiring the user to think about the object hierarchies in great detail.

Furthermore embodiments of the invention minimizes typing required by a user since the user only need to specify a simple name for an object in the objects home context or in other areas where a home condition does not exist such that the simple name will uniquely identify that object in that context, without requiring complex pathnames. If the identity of the object must be fully qualified, the user still only need to then also supply the home of the object, which can also be a simple name of the home object for the object being identified. Thus, to uniquely identify an object anywhere ion the object hierarchy, the user only need to provide, at most, two simple names and a joiner character such as an "@" symbol. The syntax then for fully qualifying the identity of an object can be, for example object-simple-name@home.

Still further, embodiments of the invention do not require a user to setup a naming scheme other than names user chooses. Since each object identifier includes the simple name, which can be user defined, and the home of an object is the simple name of another object to which that new object relates, a user can determine at his or her discretion both the simple name for the object and the home of the object (another simple name of another object, the home object).

The naming scheme provided by embodiments of this invention and provide a naming context that is sufficient for a management software application or system to identify an object in any context, or in other words, in any location within the object hierarchy.

Preferred embodiments also show representations of objects using the simple name followed by the home of the object. This shows the important part of object identifier—the simple name that quickly, and in many cases uniquely, identifies the important aspect of the object referenced by that representation—first, rather than last as in conventional naming schemes that place pathnames before the names of the files or other resources. By placing the simple name first, the important part of object identifiers or object names are aligned first, for example in a list of object representations, rather than last. This avoids misalignment of simple names of objects in such lists and lets the user quickly see the part of an object identifier that is important to the user—the simple name—first in the list, which is then followed up by the home of the object.

Other embodiments of the invention include a computer system, such as a server computer system, workstation, data storage system, network device, or other type of computer system or device configured to process all of the method operations disclosed herein as embodiments of the invention. Embodiments of the invention are applicable to any computerized device that uses a graphical user interface to represent resources. In such embodiments, the computer system includes an interface, a memory system, a processor and an interconnection mechanism connecting the interface, the processor and the memory system. The memory system can be volatile (e.g., RAM) or non-volatile (e.g., disk) storage or a combination thereof. In such embodiments, the memory system is encoded with a resource management application that when performed on the processor, produces a resource management process that representing resource (s) in a computing system environment by causing the computer system, under control of the resource management process, to perform all of the method embodiments, steps and operations explained herein as embodiment of the invention.

Other arrangements of embodiments of the invention that are disclosed herein include software programs to perform the method embodiment steps and operations summarized above and disclosed in detail below. More particularly, a computer program product is disclosed which has a computer-readable medium including computer program logic encoded thereon to provide a technique for representing resource(s) in a computing system environment as explained herein. The computer program logic, when executed on at least one processor with a computing system, causes the processor to perform the processing operations (e.g., the methods, steps and/or operations) indicated herein as embodiments of the invention. Such arrangements of the invention are typically provided as software, code and/or other data arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). The software or firmware or other such configurations can be installed onto a computer system to cause the computer system to perform the techniques explained herein as embodiments of the invention.

It is to be understood that the system of the invention can be embodied strictly as a software program, as software and hardware, or as hardware alone. Example embodiments of the invention may be implemented within the EMC Control Center (ECC) software application that provides management of resources within a storage area network environment. ECC is manufactured by EMC Corporation of Hopkinton, Mass., USA.

Also, it is to be understood that other types of devices, such as data storage systems, can operate according to, and can be configured with embodiments of the invention. That is, it is not required that the techniques explained herein operate within a computer system such as a network management station. Instead, in such other embodiments, a data storage system such as one of the Symmetrix line of data systems produced by EMC Corporation can contain operational software code, logic and/or circuitry to carry out the processing of embodiments of the invention as explained herein. In such embodiments, the data access request in an open systems format may be directly received by the data storage system from a device such as a computer system coupled to the data storage system. The data storage system can thus operate a cache manager as explained herein and can maintain the history and partition caches locally, within a memory system (e.g., a cache memory system) within the data storage system. The data storage system can also store the data (e.g., in non-open systems format) locally with storage devices such as disk drives that are also contained within and that operate in the data storage system.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, with emphasis instead being placed upon illustrating the embodiments, principles and concepts of the invention.

DETAILED DESCRIPTION OF PREFERRED EMBODIMENTS

Figure 1:
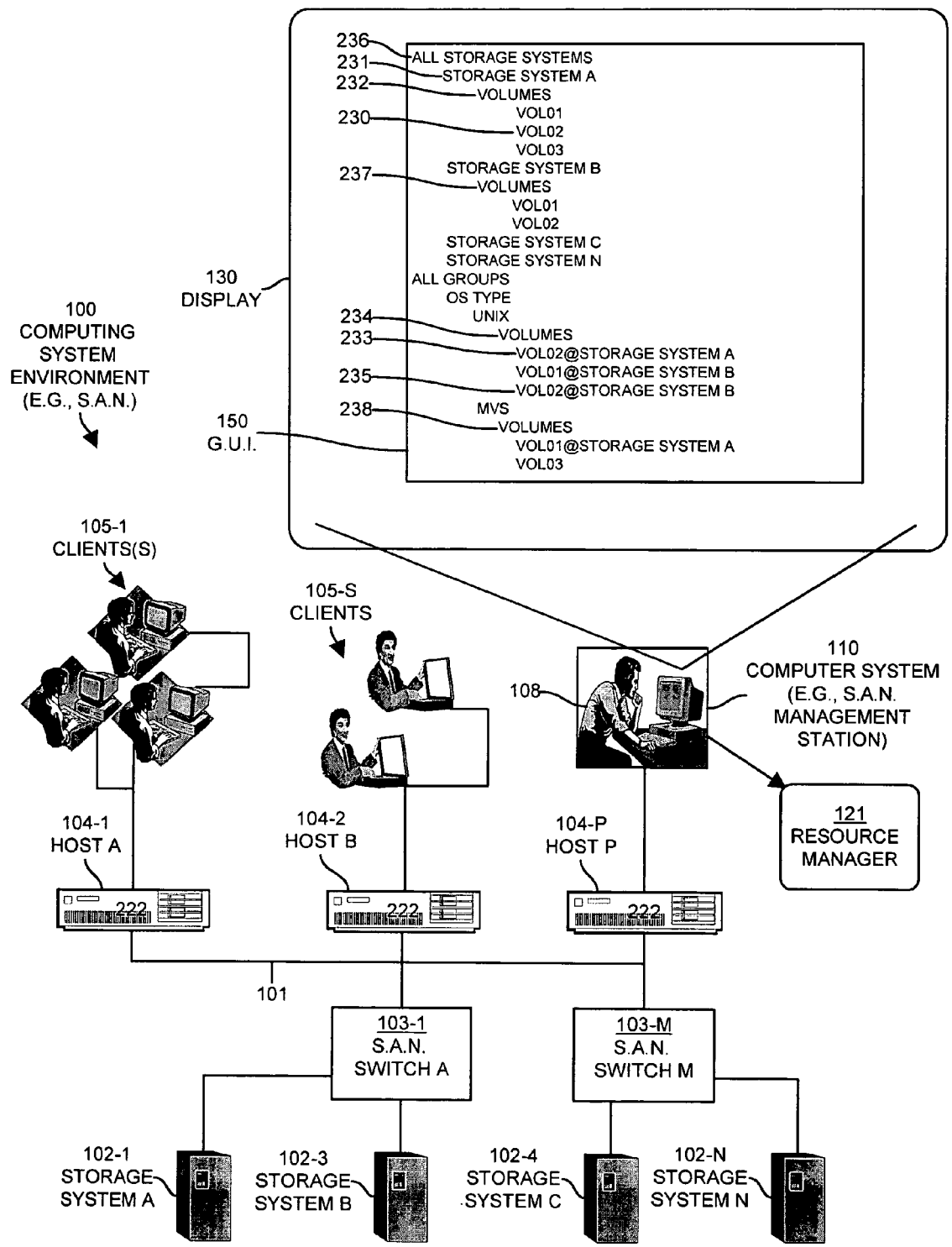
FIG. 1 illustrates an example storage area network and computing system environment including a management station computer system configured to operate according to embodiments of the invention.

Embodiments of the present invention relate to mechanisms and techniques that provide a unique resource representation scheme that can be employed, for example, within a software application or operating system that provides a graphical user interface to provide representations of objects that represent resources. Preferred embodiments of the invention are implemented within a resource management software program (i.e., application and/or process) that performs on a computer system such as a network attached workstation that is configured as a management or control station for remote management, configuration and control of resources within a computing system and network environment such as a storage area network. Resources that can be represented by embodiments of the resource management program of this invention can include, for example, network devices, computer systems (e.g., hosts, servers and client computer systems), peripherals, data storage systems and other device resources, as well as software programs or processes which operate within such resources. More specifically, embodiments of the invention provide unique naming, grouping and graphical representation techniques for such resources within a graphical user interface that the resource management program can display on a display coupled to the management station computer system.

In an environment such as a storage area network, such resources (software and hardware) often have complex physical, functional (e.g., operational) and organizational interrelationships with one another that define a resource hierarchy. For example, a high capacity data storage system resource might be comprised of many other resources such as hardware (e.g., front end and back end directors, controllers, disks, etc.) and software (e.g., operating system processes, volume constructs, etc.) components that operate within the data storage system. Certain of these resources may require access (e.g., management, control or read/write access) by different departments within an organization that operates the data storage system resource. A resource hierarchy can define, and when displayed graphically can visually convey, these physical, operational and organizational relationships between the resources in the resource hierarchy.

As a brief example operation of an embodiment of the invention, a user of the system of the invention, such as a systems or network manager or administrator, can operate a management application providing a graphical user interface according to embodiments of the invention to efficiently create and display representations of the aforementioned resources in the resource hierarchy. Embodiments of the invention provide such resource representations using a unique resource identification and grouping mechanism that efficiently conveys the identities and relationships of resources in the resource hierarchy with a minimum amount of user interaction and minimum required user sophistication.

Embodiments of the invention allow for the creation of objects that represent the aforementioned types of resources or groups of such resources. The resource hierarchy is thus represented in a computer system by creation of objects arranged in an object hierarchy. Objects in the object hierarchy can be instantiations, for example, of classes (e.g., Java or C++ classes) in an object-oriented software environment that reference each other in parent-child relationships as required to reflect the hierarchical resource relationships. Upon creation of an object, embodiments of the invention assign each object an object identifier that includes both a simple name and a home of the object. Embodiments provide a graphical user interface that can graphically display a representation of the object in the object hierarchy using either the simple name or both the simple name and the home of the object (called a fully qualified representation), depending upon the context in which the representation of the object is to be displayed. An object's simple name can be a short user defined name or may be an automatically generated name (e.g., serial number of a hardware resource) that uniquely identifies the object in a home context of the object. Embodiments of the invention determine the home of an object based upon an initial creation location of the object within the object hierarchy (e.g., placement of a new object into the object hierarchy as a child of an existing object). The home for an object and thus defines that object's home context. For example, an data storage system resource might be represented by an object which is a home to other objects that represent resources within the data storage system such as volumes, disks, controllers or the like.

A user or an automated procedure may determine other relationships (besides the home parent-child relationship) exist for an object representing a resource and thus embodiments of the invention allow a representation of that object to be placed into the object hierarchy at other locations besides the location of its home context. When such embodiments operate a graphical user interface to display the object hierarchy on a display (e.g., computer monitor) of the management computer system, such embodiments can display the representation of the object using only the simple name of the object (and possibly an object icon), for example, if that simple name is unique within the object hierarchy or is unique within the context of the location in which that representation of the object is displayed in the graphical user interface.

In other situations, embodiments may determine that the representation of the object in the graphical user interface is to include a both the simple name and the home of the object to "fully qualify" the identity of the object which that representation represents. In such situations, a "home condition" is said to exist requiring display of the home of the object in the graphical user interface. An example of a home condition existing is when two objects to be displayed in the same context (e.g., within the same level or location) in the object hierarchy have the same simple name, in which case an embodiment of the invention would display a representation of each object in a fully qualified manner using both the simple names (which are the same) and their homes (which are different) of the object identifiers for those objects. In this manner, a user can place representations of the same object in many places on a graphical user interface and the system of the invention can determine what parts of the objects identity (e.g., simple name and home) are required to be displayed at those locations to convey to the user the identity of the object.

Embodiments provide a suffix mechanism in the event that two home resources contain the same name. For example, if a storage system is a home object with the name "MASTER" and a host is a home object that also has the name "MASTER," then resources such as a volume of storage called "DATA" in the MASTER storage system and a software application called "DATA" associated with the MASTER host can be represented in an object hierarchy and each will have the same simple name and the same home name. When embodiments of the invention display representations of these objects on the graphical user interface, such embodiments can display the simple name followed by the home of these objects (e.g., DATA@MASTER) and embodiments can also append a suffix to each MASTER home such as MASTER#1 and MASTER#2 to convey to the user that there are two home resources that share the same name. The representations might thus appear in the graphical user interface as DATA@MASTER#1 and DATA@MASTER#2. The #1 and #2 convey to the user that there are two home objects having the same name.

Aside from the unique naming scheme, a computer system operating an embodiment of the invention can define an object (or multiple objects) in the object hierarchy to be a group object. A group object can represent, for example, a category in the object hierarchy under which other related objects are placed in order to interrelate those other objects according to the relationship(s) defined by the group object. For example, a user might define a "UNIX" group to categorize all resources that operate the Unix operating system. A user might create sub-groups in an object hierarchy under the top-level UNIX group for each category of resources, such as Unix volumes, Unix hosts, Unix applications and the like. When embodiments of the invention render or display specific resources within these groups, the naming scheme briefly outlined above of using the simple name or the simple name and the home for the object apply so that the user can quickly and intuitively understand which Unix resources are being referenced.

Embodiments of the invention support different types of group objects such as transparent group objects and terminal group objects. In particular, a user can create a group object to represent a group of objects sharing a common relationship and can make that group object a transparent group object. Thereafter, any objects initially created within (i.e., under or below that group object in the object hierarchy) that group obtain (i.e., are assigned) a home that is not equal to the transparent group object under which the new objects are added as child objects, but rather, the home for the new objects is set to the first non-transparent home object above the transparent object in the object hierarchy. In this manner, users can create groups for visual organization of representations of resources on a graphical user interface without effecting home relationships that need to be maintained. In other words, transparent objects provide a mechanism to create visual hierarchical relationships without effecting the name or object identifier of an object.

In addition to transparent objects, embodiments of the invention support a construct called a "terminal" object. If a user sets a group object to be terminal, then actions performed on that group object will not be carried out on members of the group. In other words, objects that are related to the terminal group object (i.e., that exist below the terminal group object in the object hierarchy) will not be effected by actions carried out by a user or process on the terminal object. As an example, a group of storage volumes might need to be represented by a terminal group object under a particular representation of a department object in order to convey that data in those storage volumes is related to a certain project in that department. However, if the terminal group object representing those volumes (the volume objects being below the group object in the object hierarchy) is acted upon under the department object (e.g., is deleted), the objects related under that group (i.e., the volumes in this example) will not also be deleted.

More specific details of the configuration and operation of embodiments of the invention will now be explained with reference FIGS. 1 through 7.

FIG. 1 illustrates an example of a computing systems environment 100 that is suitable for use in explaining the operation of example embodiments of the invention. The computing system environment 100 in this example is a storage area network that includes a network medium 101 such as a high-speed data communications medium (e.g., Ethernet, optical network, or other type of network) which interconnects a plurality of resources 102 through 110 and allows the resources to communicate with each other. The resources include a variety of data storage systems 102-1 through 102-N, storage area network switches 103-1 through 103-M, host computer systems 104-1 through 104-P, client computer systems 105-1 through 105-S, and a computer system 110 configured in this example as a storage area network management station that is operated by a network manager 108 (i.e., a person responsible for managing the resources within the storage area network 100). While not shown in detail in this figure, certain of the resources may also include or operate one or more internal devices as well as software applications or processes which operate within or in conjunction with the illustrated resources. Such other components are to be considered resources as well for purposes of this explanation.

Of particular interest to this discussion, the management station computer system 110 operates a resource manager 121 configured according to embodiments of the invention. The resource manager 121 provides a graphical user interface 150 on a display 130 (e.g., a monitor or other display device) coupled to the computer system 110. The graphical user interface 150 includes a display of an example resource hierarchy including a plurality of representations of objects shown by object names arranged line by line in an indented or hierarchical manner. Each line in the object hierarchy correspond to a manageable resource or a group of such resources within the computing system environment 100. For example, the "ALL STORAGE SYSTEM" representation represents a group object in an object hierarchy under which objects are contained for each storage system 102-1 through 102-N.

Figure 2:
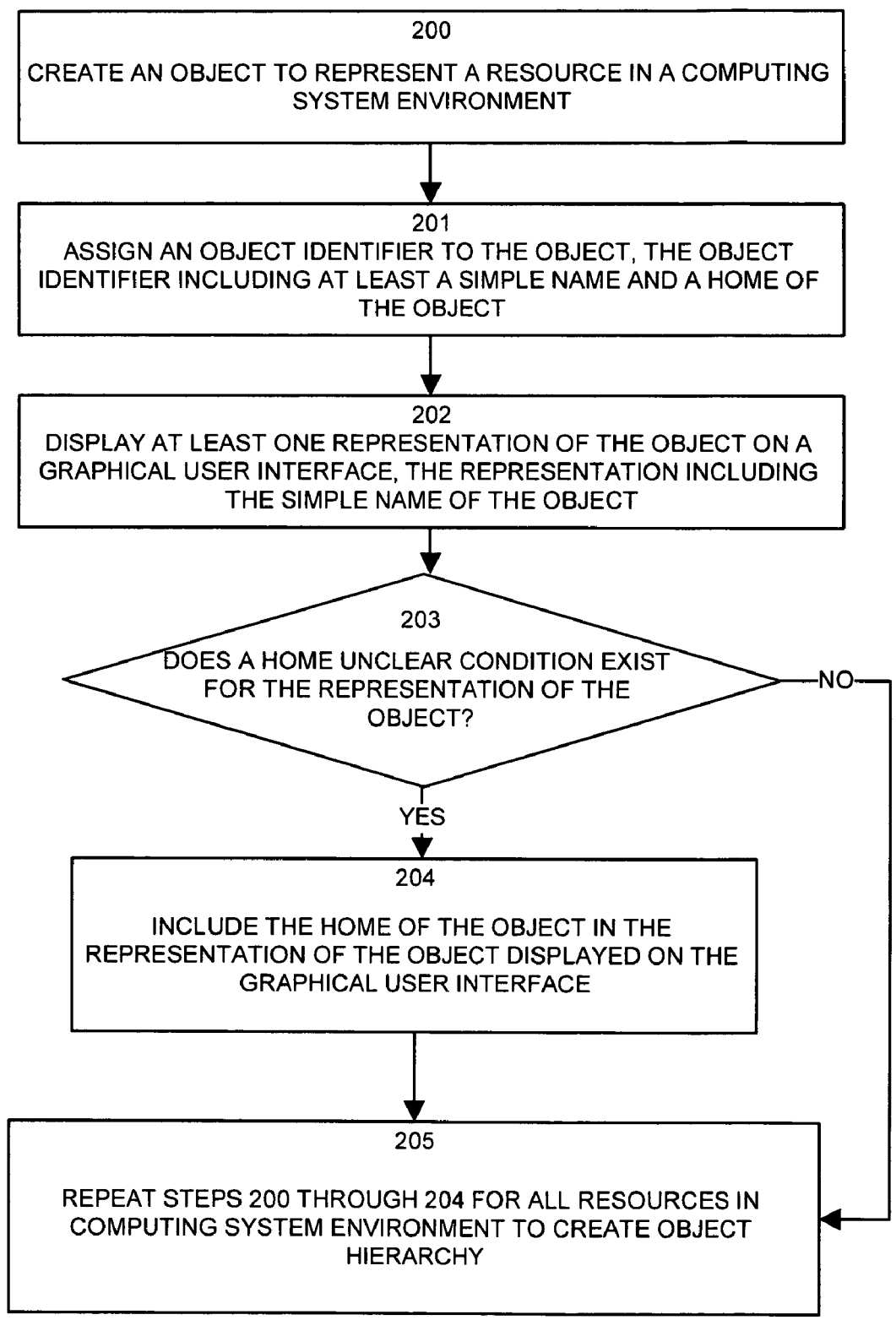
FIG. 2 illustrates an architecture of the management station computer system from FIG. 1 including an example of a graphical user interface configured according to embodiments of the invention.

FIG. 2 illustrates a flow chart of the high-level processing steps and operations which preferred embodiments of the invention perform to create representations of objects, for example, such as shown in the example graphical user interface 150 in FIG. 1. Preferably, the resource manager 121 operating within the computer system 110 performs the processing operations and steps shown in FIG. 2. The processing in FIG. 2 will be explained with respect to the creation of a representation of a single object. However, other embodiment can repetitively perform such operations to create multiple representations of multiple objects to form an object hierarchy that represents some or all of the resources in a computing system environment (e.g., 100).

In step 200, the resource manager 121 creates an object to represent a resource (e.g., one of 102 through 110) in a computing system environment (e.g., 100). Generally, the creation of an object can involve the instantiation of an object class (e.g., Java or C++ class) or other data structure which contains information related to the resource which the instantiated object represents. Different techniques for selecting or identifying resource(s) for which the resource manager 121 creates an object will be explained in more detail later. For purposes of this description, perhaps the user 108 of the computer system 110 provides an identification of a specific resource such as a volume of data storage which that user wants represented within the example graphical user interface 150 shown in FIG. 1.

In step 201, the resource manager 121 assigns an object identifier to the object. The object identifier includes at least a simple name of the object as well as a home of the object. As briefly discussed above, the simple name of an object can be a user defined or automatically generated name, text or character string, or the like which this embodiment assigns to the object to identity the resource which that object represents. The home of the object is equivalent to a home location in an object hierarchy that identifies a home (e.g., a parent) object in the object hierarchy under which (either directly under or ancestrally under) the object is initially associated (i.e., created) as a child object. A home object thus defines a home context for the object. As such, the resource manager 121 assigns the home of the object to be the home location identifying the home object for that object in the object hierarchy. Assume for this example that an object hierarchy containing objects already partially exists and that this object is being added to the object hierarchy under a home object.

As an example of steps 200 and 201, suppose in the graphical user interface 150 in FIG. 1 that the user 108 wants to create the "VOL02" volume representation 230 under the STORAGE SYSTEM A representation 231. To do so, in step 200 this embodiment creates an object (not shown) to represent the volume and in step 201, the user supplies the simple name VOL02 for the object identifier. Assume in this example that the VOLUMES representation 232 is a transparent group object that is used simply to provide visual organization to resources but that does not effect the homes of objects placed below the VOLUMES representation 232. As such, in step 201, the resource manager 121 assigns the home of the VOL02 representation 230 to be a reference (e.g., a pointer) to an object represented by the STORAGE SYSTEM A representation 231, rather that to the object represented by the VOLUMES representation 232, because the VOLUMES representation 232 is transparent.

Next, in step 202, the resource manager 121 displays at least one representation of the object on a graphical user interface (i.e., 150 FIG. 1). The representation of the object includes, at a minimum, the simple name of the object which in this example is "VOL02".

Next, in step 203, the resource manager 121 determines if a home condition exists for the representation of the object. A home condition may exist for a representation of an object, for example, if that representation of the object is to be displayed in the graphical user interface out of a home context of the object, or, if the representation of the object is to be displayed in the graphical user interface non-uniquely in a context in which the object representation is displayed. In other words, within the graphical user interface 150, if displaying the simple name of an object as a representation of the object in a graphical user interface is sufficient to uniquely identify the resource which that object representation represents, the resource manager 121 will use the simple name for display purposes without the home of the object. Alternatively however, if the user 108 viewing the graphical user interface 150 will be unable to determine a unique identity of the representation of an object from the simple name alone (e.g., there are multiple objects in the object hierarchy in the same context that all have the same simple name), then a home condition exists for the representation of that object which requires the resource manager 121 to display the home of the object in conjunction with the simple name on the graphical user interface 150 in order to clarify the identity of the object on behalf of the user 108.

If a home condition exists in step 203, the resource manager 121 proceeds the process step 204 to be included the home of the object in the representation of the object displayed on the graphical user interface 150. In the example of the representation VOL02 230, the home (STORAGE SYSTEM A) is not displayed following the simple name VOL02 since the VOL02 representation 230 is displayed in its home context (i.e., step 204 is skipped). However, notice that another representation 233 of this same volume VOL02 under the VOLUMES representation 234 (under the ALL GROUPS, OS STYPE, and UNIX representations) is displayed in a fully qualified manner as "VOL02@STORAGE SYSTEM A" since this representation 233 is displayed out of its home context and furthermore, this representation 233 has a simple name "VOL02" that is the same as the simple name "VOL02" of the representation 235. Since two representations 233 and 235 have the same simple name, each is displayed in a fully qualified manner to include its home. In this manner, the operation of embodiments of the invention is able to alter the representation of an object on the graphical user interface 150 to provide either the simple name of the object or to provide the object identifier in a fully qualified manner including the simple name and the home of the object, depending upon the requirements need to uniquely identify a resource represented by those representations.

If, in step 203, the resource manager 121 determines a home condition does not exist for the representation of the object, or upon completion of processing step 204, processing proceeds the step 205 in which the resource manager 121 can repeat the steps 200 through 204 for all resources in a computing system environment to create an object hierarchy and to provide a display of the hierarchy within the graphical user interface 150. As noted above however, the object hierarchy may initially exist with a minimal number of objects, such as only a root object. As such, repetitive processing steps 200– 2204 can result in the creation of an entire object hierarchy to represent all resources in a computing system environment 100 by representations of objects on the graphical user interface 150.

Each representation can include either the simple name of the object or the simple name and the home of the object depending upon the context in which that representation is displayed. If the representation of the object is displayed, for example, in its home context (i.e., is displayed under the representation of the home object which is home to that object) then the simple name can be used to uniquely identify the representation of the object since that representation is displayed in a home context for that object (or is otherwise uniquely identifiable in the context in which it is to be displayed). Alternatively, if a user or other process determines that a representation of the same object is to be contained or displayed elsewhere within the graphical user interface (e.g., in order to convey other relationships which are applicable to a resource which that representation represents), then embodiments of the invention may determine in certain instances that a home condition exists that also requires the display of the home of the object.

Briefly directing attention now back to the example graphical user interface 150 shown in FIG. 1, the resource manager 121 creates and displays each representation of an object on a separate line as a character string in this example.

For example, the ALL STORAGE SYSTEMS representation 236 is a representation of a group object that provides a grouping mechanism to group storage system objects, which are each respectively shown by the representations STORAGE SYSTEM A through STORAGE SYSTEM N. Each storage system in the computing system environment 100 in FIG. 1 is thus shown by a respective representation in the graphical user interface 150. Also in this example, under STORAGE SYSTEM A and STORAGE SYSTEM B, the resource manager 121 displays a respective VOLUMES group object representation 232, 237 in order to convey to the user 108 what volumes are located in each respective storage system. Specifically, volumes identified by the representations VOL0I through VOL03 are contained within STORAGE SYSTEM A and volumes identified by the representations VOL01 and VOL02 are contained within STORAGE SYSTEM B.

The representations of volumes VOL01 and VOL02 within each storage system A and B are displayed using only the simple names of the object identifiers for each of these volumes. As explained above for VOL02 230, this is because these volume representations are shown within or under their home contexts in the graphical user interface 150. In other words, the user 108 intuitively understands by viewing the simple names only that VOL01 and VOL02 for STORAGE SYSTEM A are clearly related to the group object representation VOLUMES 232 under the STORAGE SYSTEM A representation, whereas VOL01 and VOL02 for STORAGE SYSTEM B are clearly related to the group object representation VOLUMES 237 under the STORAGE SYSTEM B representation. Since the resource manager 121 displays these volume representations within their home contexts only the simple name is used to represent these resources.

Conversely, the "VOLUMES" representations 234 and 238 represent groupings of any Unix or MVS volumes that exist within the computer system environment. Since the simple names VOL01 and VOL02 exist for different volumes in different storage systems, the resource manager 121 displays the specific volume representations for the volumes VOL02@STORAGE SYSTEM A, VOL01@STORAGE SYSTEM B, VOL02@STORAGE SYSTEM B and VOL01@STORAGE SYSTEM A in a fully qualified manner using both the simple name and home of the objects (not shown) that correspond to these volumes (i.e., to these resources) in order to convey to the user 108 which specific volumes are UNIX and MVS volumes. In this example, the simple name and home of the object are separated with an "@" symbol which allows the user 108 to quickly distinguish between the simple name and home of a volume.

The fully qualified syntax of a representation of an object in a graphical user interface thus appears as follows in this example embodiment: OBJECT-ICON OBJECT-SIMPLE-NAME@HOME-OF-OBJECT. Aside from a object icon (which is optional in the graphical user interface and is not shown in the example in FIG. 1), since the simple name of the object is shown first in the representation of the object, a user viewing a graphical user interface that contains many representations of many objects expressed in this syntax can quickly and easily determine the identity of every object representation in the-list since each object's simple name, which is the most important part of the object identifier assigned to that object from the user's perspective, is shown first. If the graphical user interface lists many objects in a vertical manner (e.g., the list of specific volumes), each simple name of each object representation lines up in a linear (e.g., left justified, and top-to-bottom) manner making it easy for the user to distinguish one object representation from another.

Figure 3:
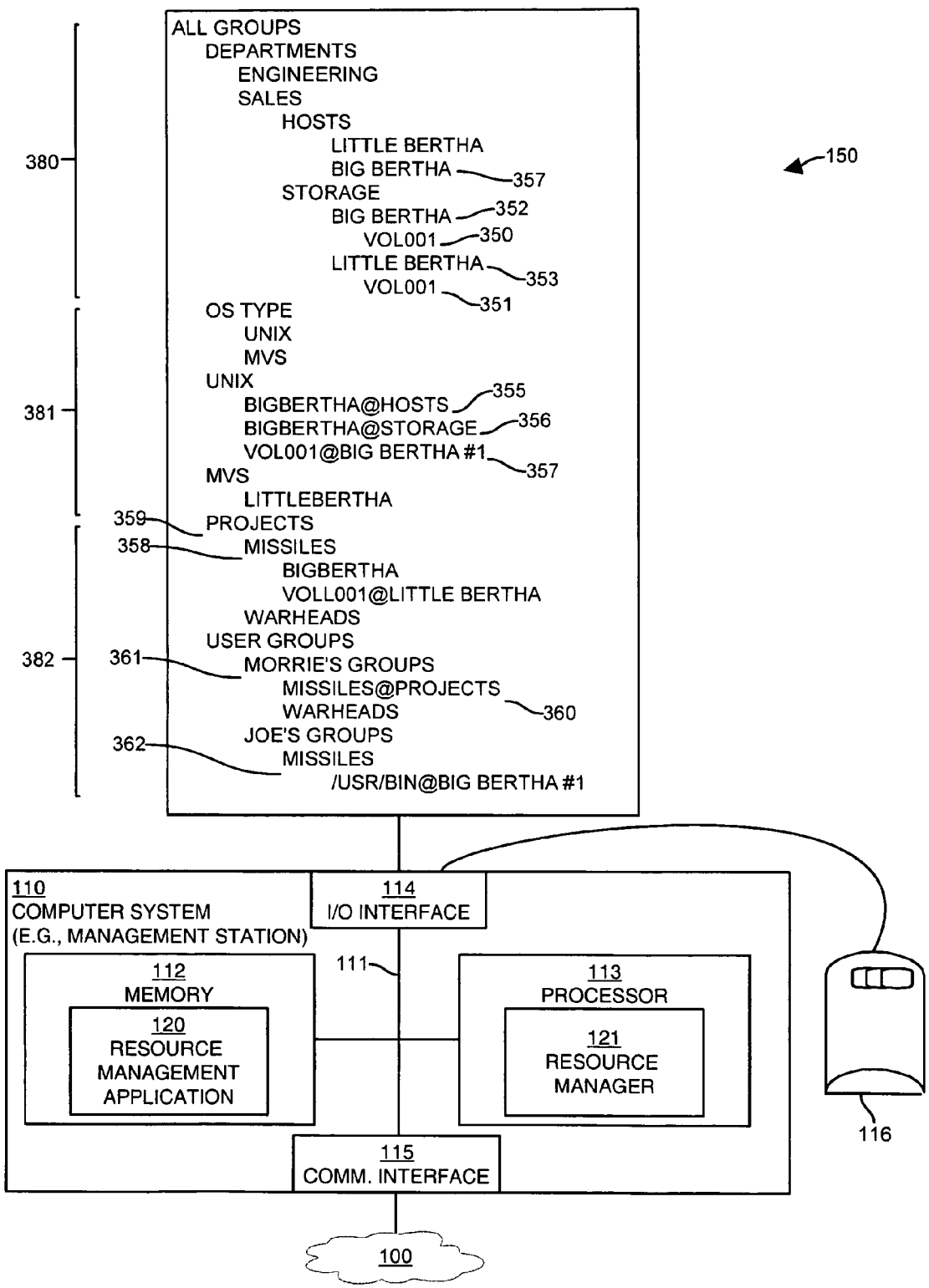
FIG. 3 shows an example of a graphical user interface configured according to embodiments of the invention.

FIG. 3 illustrates an example architecture of the computer system 110 configured according to embodiments of the invention. The computer system 110 may be any type of computerized device such as a personal computer, workstation, portable computing device or the like. The computer system 110 includes an interconnection mechanism 111 which couples a memory system 112, a processor 113, an input/output interface 114 and a communications interface 115. The input/output interface 114 allows peripheral devices such as the display 130 (e.g., computer monitor, FIG. 1) to be connected to the computer system 110 for rendering the graphical user interface 150. In addition, a peripheral input device 116 such as a mouse or keyboard and is coupled to the input/output interface 114. The communications interface 115 allows the computer system 110 to communicate with software or hardware devices (i.e., resources) that operate within the network 100.

The memory system 112 is encoded with a resource management application 120. The resource management application 120 represents software code such as data and/or logic instructions (e.g., stored in the memory or on another computer readable medium such as a disk) that embody the processing functionality of embodiments of the invention. The processor 113 can access the memory system 112 via the interconnection mechanism 111 in order to launch, run, execute, interpret or otherwise perform the logic instructions of the resource management application 120 in order to produce the resource manager 121. In other words, the resource manager 121 represents one or more portions of the resource management application 120 (or the entire application 120 performing within or upon the processor 113 in the computer system 110.

Is to be understood that embodiments of the invention include the resource management application 120 (i.e., the un-executed or non-performing logic instructions and/or data) encoded within a computer readable medium such as a floppy disk, hard disk or in an optical medium, or in a memory type system such as in firmware, read only memory (ROM), or, as in this example, as executable code within the memory system 112 (e.g., within random access memory or RAM). It is also to be understood that other embodiments of the invention comprise the resource management application 120 operating within the processor 113 as the resource management process 121. While not shown in this example, those skilled in the art will understand that the computer system 110 may include other processes and/or software and hardware components, such as an operating system, which have been left out of this illustration for ease of description of the invention.

As illustrated in FIG. 3, the resource manager 121 produces an example graphical user interface 150 which conveys a representation 151 of another example object hierarchy (not shown in this figure). Details of the representation 151 which are specific to embodiments of the invention will be explained after an explanation, in FIGS. 4 and 5, of an example of a single object data structure (FIG. 4) and an example object hierarchy (FIG. 5) which correspond to the representation 151 in FIG. 3.

Figure 4:
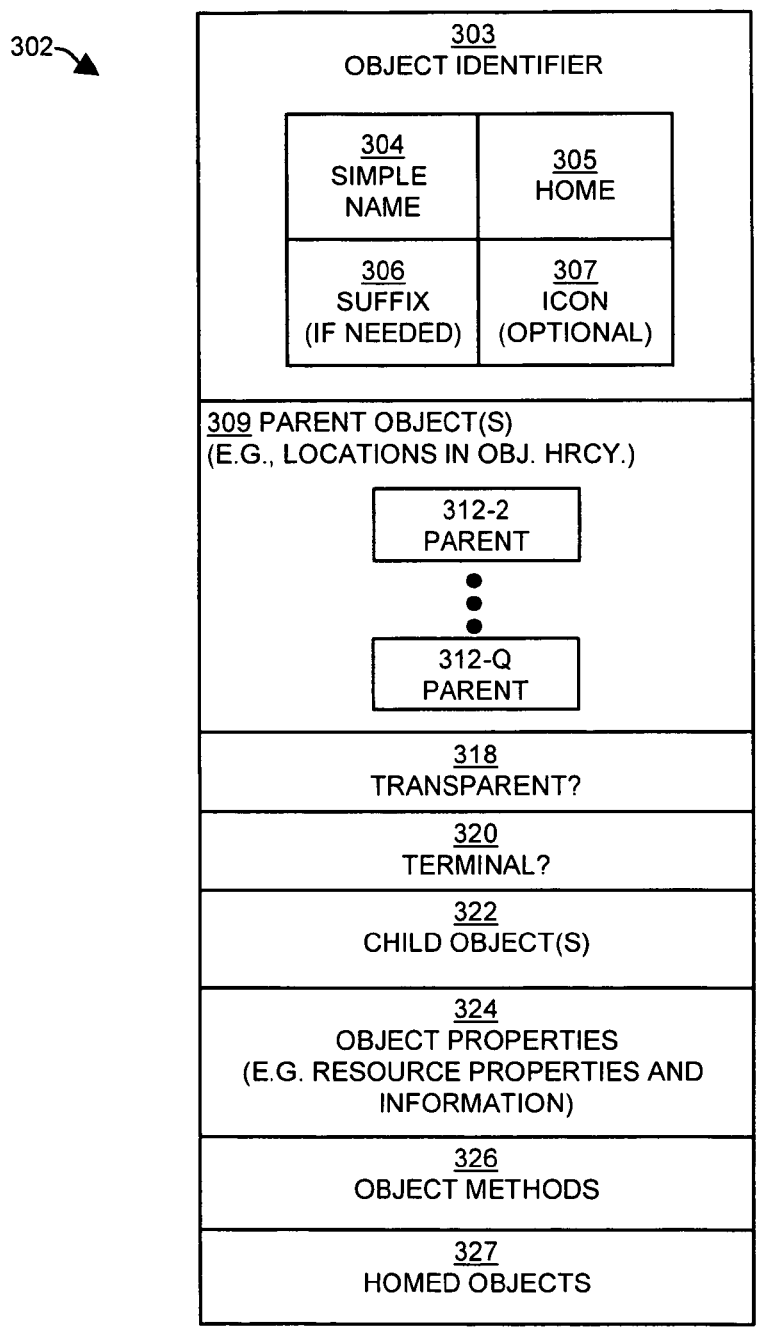
FIG. 4 is a flow chart of processing steps that show the general operation of a resource management process providing a graphical user interface configured according to embodiments of the invention.

FIG. 4 illustrates an example of an object data structure 302 (e.g., a class definition) suitable for use by embodiments of the invention. The object 302 comprises a plurality of fields 303 through 326 which include an object identifier 303, a list of one or more parent object(s) 309, a group object indicator 316, a reference to one or more child objects 322, a reference to one or more object properties 324 and a reference to one or more object methods 326. The object identifier includes a simple name 304, a home of the object 305, a suffix portion 306 (if required, as will be explained) and an optional icon 307. These fields 304 to 307 generally comprise the information that the resource manager 121 can display on the display 130 to provide a representation of the object in the graphical user interface 150. Some or all of the information from the object identifier fields 304 through 307 may be used to represent a resource in a graphical user interface 150.

As previously noted, the simple name 304 generally contains an alpha numeric string of characters which uniquely identify a resource which this object 302 represents within its home context. The home context is determined by the home of the object 305 which is obtained from a reference to the home object 310. When the resource manager 321 initially creates the object 302, a user or other process (e.g., a discover process, to be explained) identifies another object 302 within an object hierarchy under which this object 302 is to be created. The initial placement location within an object hierarchy determines which object 302 within a hierarchy initially becomes a home object 310 for the object 302 and thus defines the home 305 of the object 302.

The resource manager 121 may require a representation of the object 302 in other locations within an object hierarchy. To provide for such other representations, parent object indicators 312 indicate the identity of other objects 302 besides the home object 310 under which a representation of this object 302 should be created in order to render the representation on the graphical user interface 150 with a resource manager 121 displays the graphical user interface 150. For each parent object indicator 312, a corresponding home condition 314 is included which the resource manager 121 uses to determine whether or not the home of the object 305 is to be included in the representation of the object when displayed within the graphical user interface 150.

The group object indicator 316 indicates whether or not the object 302 is to be considered a group object. As explained above, group object generally do not represent any one particular physical resource (i.e., do not represent a specific software or hardware resource), but rather, represent a collection or group of such resources which may be represented and acted upon collectively. The group object indicator 316 includes transparent and terminal indicators 318 and 320. Generally, the transparent and terminal indicators 318 and 320 contain, for example, boolean values that indicate whether or not this object 302 is to be considered transparent and/or terminal with respect to its placement within an object hierarchy in relation to other objects 302. As noted above, a transparent object does not act or serve as a home to objects placed below it in an object hierarchy. A terminal object, whose purposes will be explained in more detail later, generally prevents actions that are applied to the terminal group object from being applied to that terminal group object's child objects. In other words, if a user attempts to apply an management function or action on an object that is terminal, that function or action will not be applied to objects related below that object in an object hierarchy.

The child object references 322 provide pointers, references or other indicators of any child objects which are related below this object 302 within an object hierarchy. The object properties fields 324 identifies any other properties related to a resource which this object 302 represents. As an example, the object properties field 324 may contain resource specific information such as device configuration information, software version or operation information, device or software serial numbers, or any other information which may be pertinent or beneficial to have in order for the object 302 to represent a specific resource within a computing system environment 100. In addition, the object methods 326 contain references to any functions, operations, methods, routines, libraries or procedures which defined logical operations related to the resource which this object 302 represents. Within a resource management application 120, the object methods 326 may define, for example, the management functionality or actions which a user 108 can apply or invoke to manage a specific resource associated with the object 302.

Figure 5:
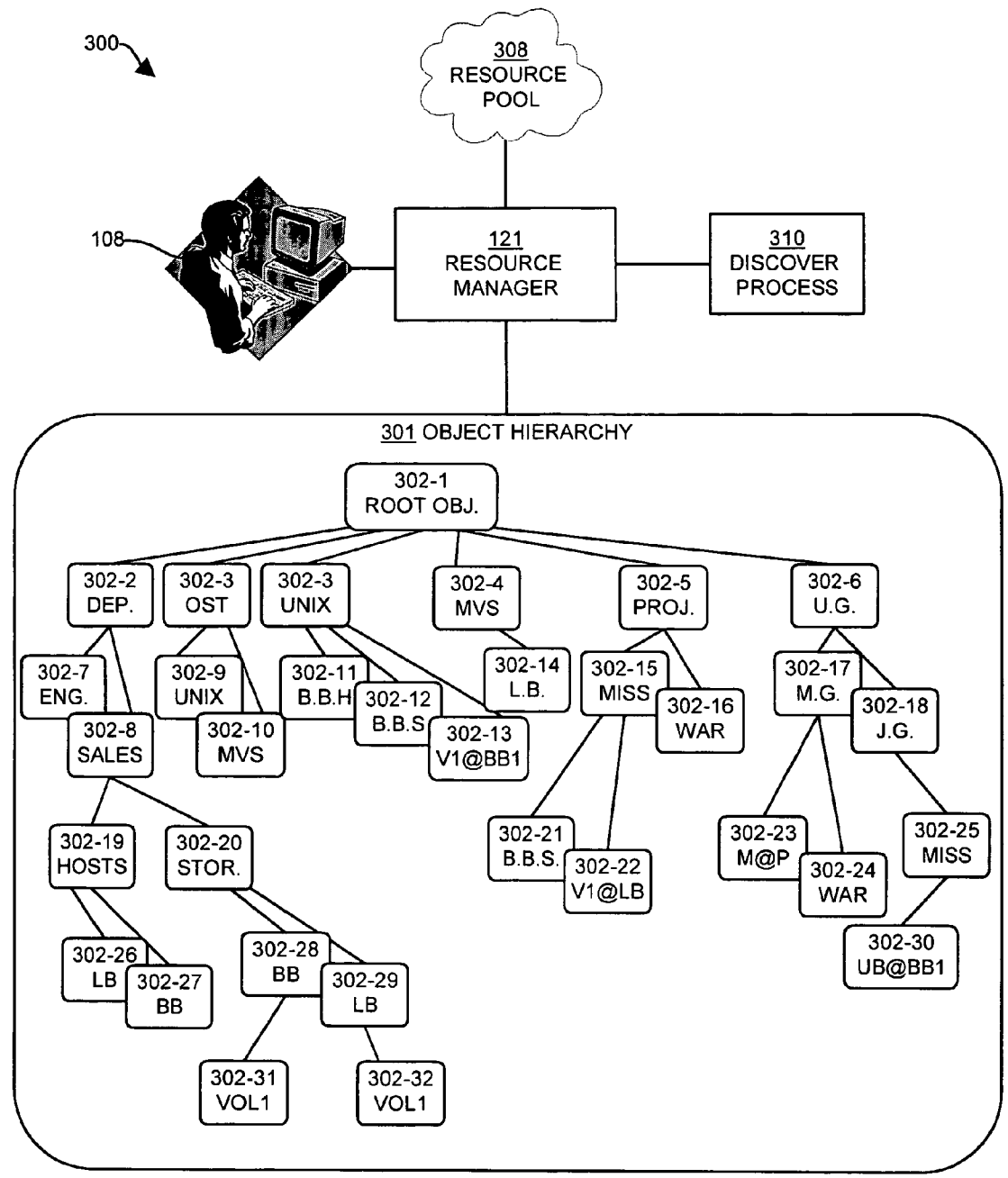
FIG. 5 is a diagram of an operational environment in which the resource management process operates.

FIG. 5 illustrates an operational environment 300 in which the resource manager 121 can receive input from the user 108 and optionally from a discover process 310 in order to access a resource pool 308 to produce an object hierarchy 301 containing objects 302 that represent various resources or groupings of resources in the resource pool 308. In this example, the object hierarchy 301 contains an object for each representation from the graphical user interface 150 in FIG. 3. That is, there is a one to one correspondence between each object 302 in the object hierarchy 301 in FIG. 3 and each representation of an object (e.g., 350 through 362) shown in the hierarchical graphical user interface 150 in FIG. 3.

In FIG. 5, the resource pool 308 represents a set of resources (e.g., 102 through 110 in FIG. 1) within a computing system environment 100 which are accessible by the resource manager 121 for display and management within the graphical user interface 150. During the creation and representation of the objects 302 as previously explained with respect to FIG. 2, the user 108 can use the resource manager 121 to query the resource pool 308 of available manageable resources in order to create the objects 302 at proper locations within the object hierarchy 301. The resource manager 121 may also operate in conjunction with a discover process 310.

Generally, the discover process 310 is capable of automatically querying resources in the resource pool 308 (e.g., querying devices in a storage area network) to discover information about each resource and is then able to invoke the resource manager 121 according to the techniques as explained herein in order to create an object 302 that corresponds to each discovered resource and can further display a representation of that object on the graphical user interface 150. This process is repeated for each resource in the resource pool 308 resulting in an automated creation of the object hierarchy 301 and the graphical user interface 150 containing the representation 151 of the object hierarchy.

Returning attention back to FIG. 3 and specifically to the graphical user interface 150, the example representation 151 of the object hierarchy contains a representation of each distinct object 302 in the object hierarchy 301 from FIG. 5. That is, each object 302 is shown by a corresponding representation of an object in the graphical user interface 150. To display the graphical user interface 150, the resource manager 121 is able to traverse the object hierarchy 301 and, for each object 302 contained in the object hierarchy 301, is able to display a representation of that object 302 on the graphical user interface 150 according to the naming and grouping techniques explained herein.

The resource manager 121 displays most representations of objects from the object hierarchy 301 using only the simple name 304 of the object if the simple name uniquely identifies an object 302 in the context in which it is displayed within the graphical user interface 150. By way of example, in the graphical user interface 150 in FIG. 3, the representations 350, 351 of the volume objects 302-13 and 302-22 from FIG. 5 have the same simple name "VOL001" and do not need to include their respective homes 305 (e.g., "BIG BERTHA" and "LITTLE BERTHA,") since each is respectively displayed in its home context (i.e., under the representations of their home objects 302-28 and 302-29 (FIG. 5).

The notion of home context may vary depending upon specific embodiments of the invention. In this example, the term "context" or "home context" is defined by a specific level (e.g., right indentation level in the example hierarchy shown in FIG. 3) in the hierarchy in conjunction with a common listing of representations of objects at that level (i.e., at the same location in the hierarchy). In other words, what is meant by a common listing of two objects having the same context is the existence of two or more representations of objects in the same level and at the same location in the object hierarchy. As an example with respect to FIG. 3, under the UNIX group representation 354 the representations 355 through 357 of UNIX host and storage system resources are each shown in a fully qualified manner using both simple names and homes of the corresponding objects 302-11 through 302-13 in the object hierarchy 301. The resource manager 121 displays the representations 355 and 356 in a fully qualified manner as "BIGBERTHA@HOSTS" and "BIGBERTHA@STORAGE" since the simple name "BIGBERTHA" would not serve to uniquely identify each of these resources in the context of being displayed together (i.e., in the same location and level) under the UNIX group representation 354 within the representation 151 of the object hierarchy 301 in the graphical user interface 150.

Directing attention now to the representation 357 of the volume object "VOL001@BIGBERTHA# 1," two unique aspects of embodiments of the invention are illustrated by this representation 357. In particular, this example embodiment of the resource manager 121 includes the home of the volume object "BIGBERTHA" in the representation 356 because there are multiple objects 302-13 and 302-22 that represent volume resources that have the simple name VOL001. As such, if only the simple name VOL001 were used in the representation 357, the user would be unaware of which particular volume resource was being referenced.

In addition, the representation 357 illustrates an example operation of embodiment of the invention which appends a suffix to the end of the home 305 of an object in the event that a home condition also indicates that there are multiple home resources that have the same simple name. Specifically, the resource manager 121 in FIG. 3 appends a suffix "#1" to the home "BIGBERTHA" in order to uniquely identify which specific "BIGBERTHA" home resource with which the volume resource VOL001 is associated. This is because there are two BIGBERTHA home resource representations 357 and 352. In other words, this embodiment of the resource manager 121 can append a suffix to the end of the home of an object within the graphical user interface 150 if the resource manager 121 determines that the home 305 is not unique within the object hierarchy 301. The suffix "#1" in this example indicates to the user 108 that there are multiple BIGBERTHA home resources that the computer system 110 can represent and thus the user might want to check to be sure which instance of VOL001 is represented by the representation 356.

In one embodiment of the invention, a user action such as moving a mouse over the representation 356 can trigger the resource manager 121 to provide a tool tip or pop up window which indicates or provides a more detailed explanation of which particular volume resource VOL001 is being referenced at this location 356 within the graphical user interface 150. The pop-up or tool-tip might present the full path name of the VOL01 resource within the object hierarchy 301. Generally then, embodiments of the invention can assign a suffix to the home of an object if the home of the object conflicts with a home for another object within the computing system environment, such that the homes of each object will be different from each other.

Other aspects of the example representation 151 of the object hierarchy 301 include the ability to convey different types of relationships between the same representations of objects by groups or grouping. In particular, the example representation 151 of the object hierarchy includes an area 380 that conveys physical relationships between resources represented by objects 302 in the object hierarchy 301. In addition, software, logical or operational relationships are conveyed to the user by the representations in the area 381 that categorizes or groups resources according to different operating system types that those resources operate. Finally, in the area 382, representations of resources are arranged by organizational, department or user functions. Specifically, within the area 382, resources are arranged by projects and users associated with those resources. It is to be understood that a resource manager 121 configured according to embodiments of the invention can allow a representation of a single resource to appear in multiple locations within the entire representation 151 of an object hierarchy 301. This is referred to as groups or grouping in embodiments of this invention.

As an example of grouping, a user is able to create an object 302 that does not represent a physical resource but rather represents a group of such resource. The user can then populate the child objects field 322 of that group object 302 with references to actual physical or logical resource objects 302. Stated generally, a group object and representation thereof can contain reference to any number of child objects 302 in the object hierarchy 301, some or all of which may correspond to resources or other groups of resources.

As a specific example with respect to the graphical user interface 150 in FIG. 3, the representation of the group object MISSILES 358 is defined under the representation of the group object PROJECTS 359 and is also defined or referenced at location 360 as a member of MORRIE'S GROUPS 361. Notice that the representation 360 of the MISSILES group is shown in a fully qualified manner since this representation 360 is out of its home context and that there is a second representation of an object 362 that also contains the simple name "MISSILES." As such, the resource manager 121 of this embodiment of the invention indicates to the user 108 that the representation 360 "MISSILES@PROJECTS" refers to the MISSILES representation 358 rather than the MISSILES representation 362.

Using the aforementioned techniques of simple names, homes of object, grouping and suffixes, a resource manager 121 configured according to embodiments of the invention is able to provide representations of objects which are unique in the context in which they are displayed within a graphical user interface 150 and which also provide a short concise way to indicate to user 108 which resource is being referenced by the particular representation. Furthermore, such embodiments allow a single resource to be represented by multiple representations in different locations within a graphical user interface 150 while ensuring that the user 108 can identify which resource is being referenced at a specific location in situations where there are either multiple resources having the same simple name or in situations where it might not be completely intuitive for a user to know which resource is being referenced.

Figure 6:
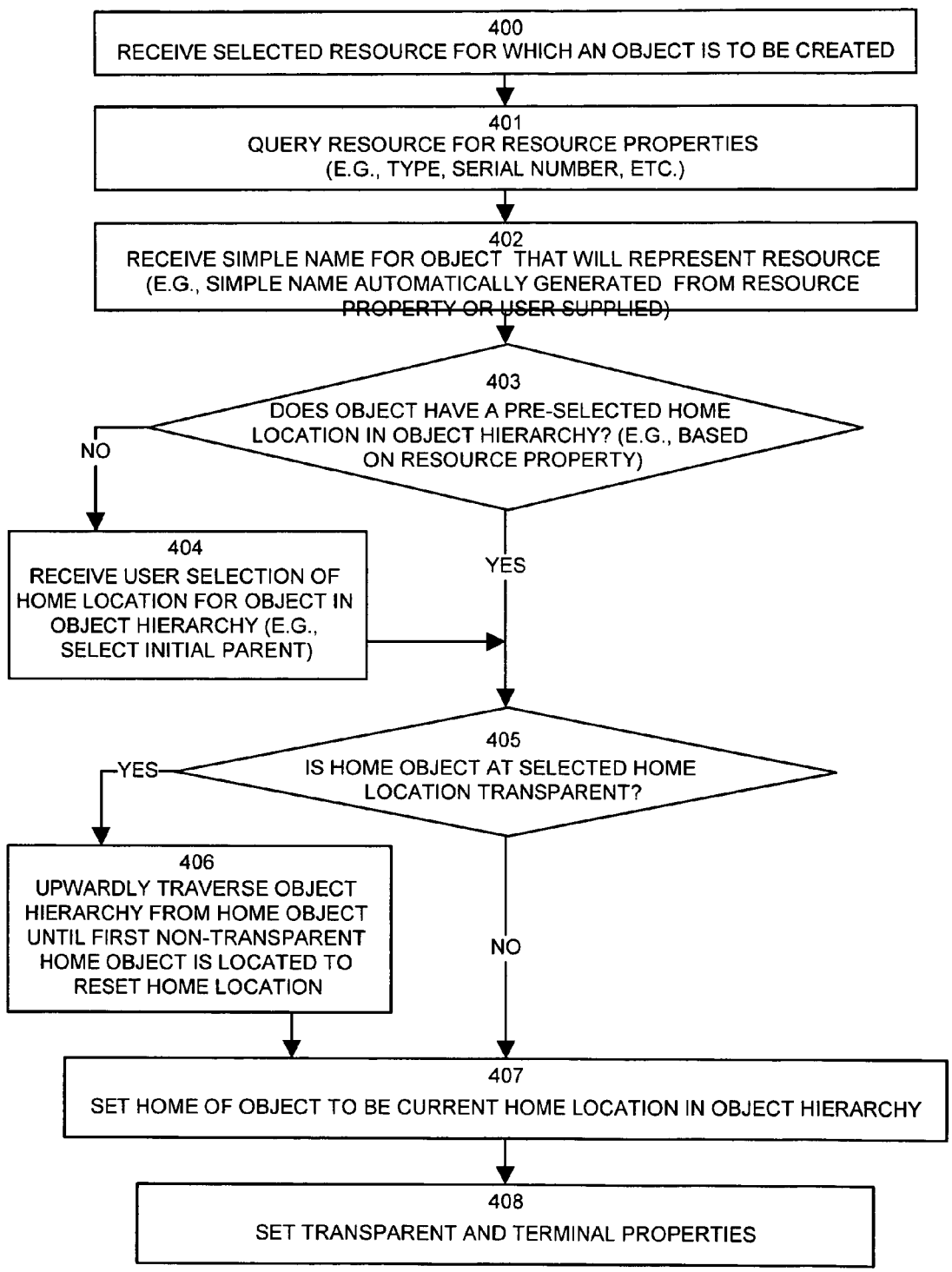
FIG. 6 is a flow chart of processing steps performed by a resource manager to allow a user to create an object within an object hierarchy.

FIG. 6 is a flow chart of processing steps which a resource manager 121 can perform according to embodiments of the invention to allow a user 108 or a discover process 310 to create an object 302 within the object hierarchy 301.

In step 400, resource manager 121 receives an identification of a selected resource for which an object 302 is to be created in the resource hierarchy 301. As noted above, either the user 108 or to discover process 310 can provide such an identification of a resource.

Next, in step 401, the resource manager 121 queries the selected resource for any resource properties associated with that resource. Resource properties can include, for example, the type of resource (e.g., hardware, software, device, etc.), a serial number, name or other identification associated with the resource, or any other information which may be pertinent or relevant for the use of the resource management application 120.

In step 402, the resource manager 121 receives a simple name for the object 302 that will represent the resource. As an example, the resource manager 121 may use the serial number from the resource properties as the simple name 304 for the object 302. Alternatively, the user 108 may supply the simple name 304 as a text string. The simple name should be unique in its home context. If not, the resource manager 121 can prompt the user to enter a unique simple name for the object 302 that will represent the resource.

In step 403, the resource manager determines if the object 302 has a pre-selected or predetermined home location within the object hierarchy 301. This determination may be made, for example, using a specific resource property that indicates that the resource for which this object 302 represents is related to another particular resource. As an example, if the resource for which the object 302 represents is a disk drive in a data storage system, then perhaps the data storage system resource itself (i.e., an object 302 corresponding to the data storage system) serves as the home location in the object hierarchy 301 for the disk resource object 302. Generally, some resources may have predefined home locations that depend upon pre-existing relationships to other resources. For instance, software applications which are installed in a particular computer system may use an object 302 that represents that computer system in the object hierarchy 301 as their home 305. To illustrate the home concept with additional examples, disks and volumes may have predefined homes of the storage systems in which the reside. Files may have a pre-defined home of the volume or partition in which they reside. Ports may have a home of a switch or router in which they reside, and so forth.

If the resource manager 121 determines in step 403 that no pre-selected or predetermined home 305 is assigned or is apparent for the resource for which the object 302 represents, processing proceeds to step 404 at which point the resource manager 121 receives a user selection of a home location for the object 302 within the object hierarchy 301. For example, the resource manager 121 can allow the user 108 to select a particular home object 302 within the object hierarchy 301 (e.g., via displaying the current hierarchy 301 in the graphical user interface 150) to serve as the home for the new object been created according to the processing steps in FIG. 6.

After processing step 404, or, after the resource manager determines a pre-selected home location in step 403, processing proceeds to step 405 at which point the resource manager 121 determines if the home object located at the selected home location within the object hierarchy 301 is "transparent". As explained above, if an object 302 is indicated as being transparent 318 (FIG. 4), then that object 302 cannot serve as a home object. As such, new child objects which are initially created or inserted below a transparent object in the object hierarchy 301 will not have their home 305 assigned to the transparent object. Rather, such new objects will be assigned a home which is equal to the first non-transparent object that is hierarchically above the transparent object within the object hierarchy 301. In this manner, transparent object can be used to categorize or group resources without requiring the group objects to be included in a home that defines a path to the object in the object hierarchy 301.

In step 405, if the resource manager 121 determines that the home object 302 at the selected home location in the object hierarchy 301 is transparent, processing proceeds to step 406 at which point the resource manager 121 upwardly traverses the object hierarchy 301 starting from the selected home object location (i.e., starting at the transparent object) until the resource manager 121 encounters the first non-transparent home object within the object hierarchy 301 thus identifying a proper home location to be that first non-transparent home object in the object hierarchy 301.

In step 405, if the home object at the selected home location is not transparent or, after processing step 406 to find the home to a non-transparent object that exists above the transparent object in the object hierarchy 301, the resource manager 121 proceeds to process step 407 at which point the resource manager 121 sets the home of the object 305 to be the current (i.e., identified) home location within the object hierarchy 301.

Next, in step 408 the resource manager 121 (i.e., under direction of the user 108) sets the object group 316, transparent 318, and terminal 320 properties for the newly created object 302. In other words, the resource manager 121 prompts the user 108 to indicate whether or not the new object 302 just created is to be a group object and if so, is the group object to be transparent or terminal. As noted above, if an object is indicated by a user 108 as being terminal, the actions performed by the user 108 on that object are not carried out on child objects that hierarchically relate below the terminal group object. This provides a mechanism for a user 108 to create a group object in the object hierarchy in order to categorize resources, for example. Then, if this group object is related for example to another group object which is acted upon in some manner, any child objects which depend from (i.e., that hierarchically relate below) the group object that is marked as terminal will be unaffected by those actions. Terminal group objects thus provide a security mechanism by which a user can place a representation of resources within the graphical user interface 150 without fear of accidentally manipulating, operating upon or otherwise changing any aspects of those resources.

Figure 7:
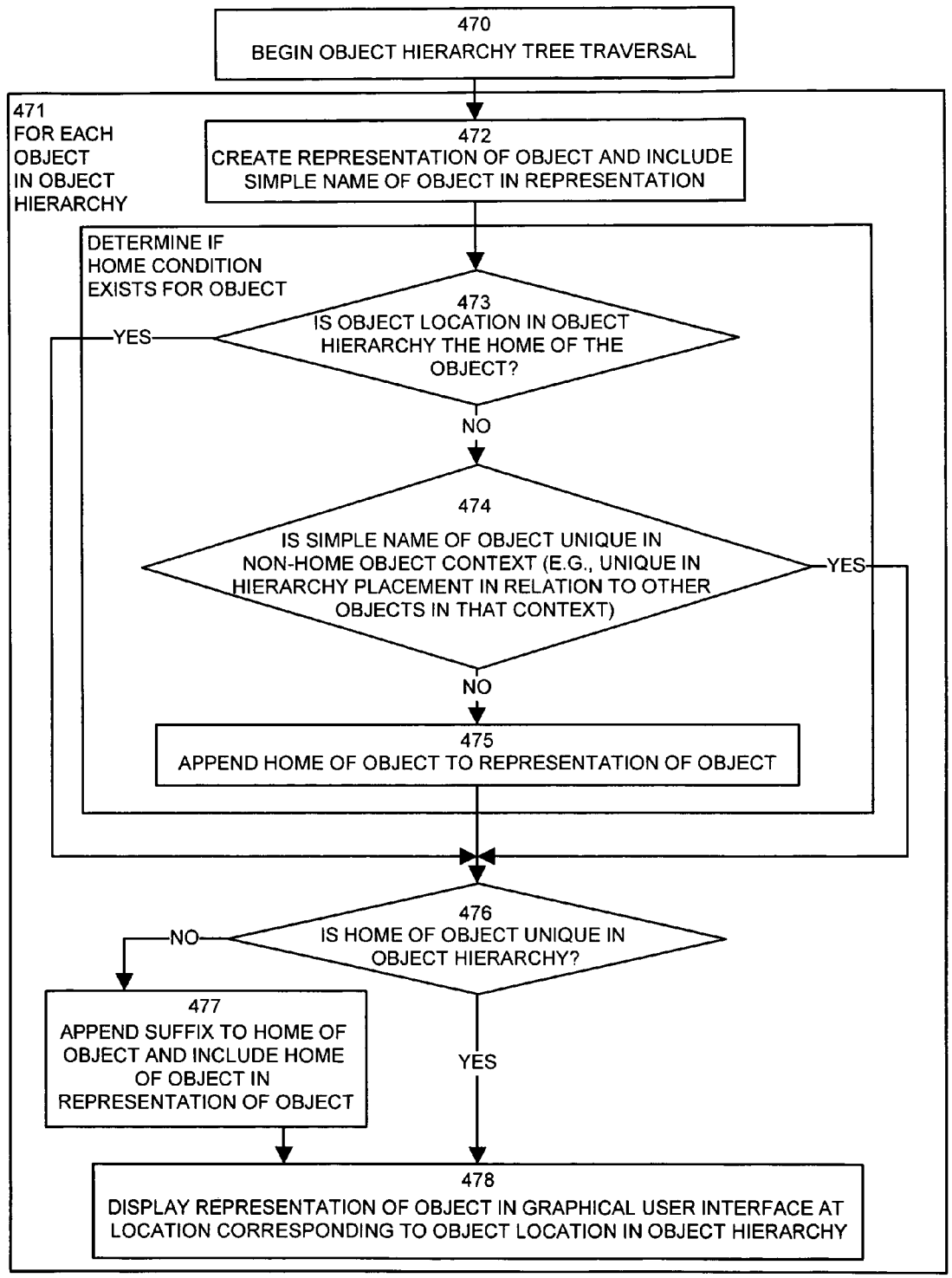
FIG. 7 is a flow chart of processing steps performed by the resource manager to traverse the object hierarchy to produce representations of objects within the graphical user interface.

FIG. 7 is a flow chart of processing steps which the resource manager 121 performs according to one embodiment of the invention in order to traverse the object hierarchy 301 to produce representations of objects within a graphical user interface 150.

In step 470, the resource manager 121 begins an object hierarchy 301 tree traversal process. The resource manager 121 can use any type of tree traversal algorithm to obtain information concerning each object 302 within the object hierarchy 301.

Next, in step 471, the resource manager 121 enters an execution loop which operates upon each object 302 within the object hierarchy 301.

Within the loop 471, in step 472, the resource manager 121 creates (e.g., in the memory 112) a representation of the object 302 (the object being obtained from the tree traversal process) and includes in the representation the simple name of the object 304.

Next, the resource manager 121 performs steps 473 through 475 to determine if a home condition exists for the object 302.

Specifically, in step 473, the resource manager 121 determines if the object location of the object 302 in the object hierarchy 301 is the home 305 of the object. In other words, in step 473, the resource manager 121 examines the current tree location of the object 302 (from the tree traversal process) and compares this location value against the home of the object 305 as defined within the object 302. If they are the same, processing proceeds to step 476. However, if the location within the tree is not the same as the home 305 of the object 302, then this means that a representation of the object is going to displayed outside of its home context and processing proceeds to step 474.

In step 474, the resource manager 121 determines if the simple name of the object 304 is unique in the non-home object context in which this representation is to be displayed. In other words, the resource manager 121 determines if the simple name is unique in the hierarchy placement or location in relation to other objects in that same context or hierarchy location placement. This may be done, for example, by comparing the simple name 304 with the simple names 304 of all other objects 302 at that same location in the object hierarchy 301. If the simple name 304 is not unique, processing proceeds to step 475.

In step 475, the resource manager 121 appends the home of the object 305 to the representation of the object (i.e., in memory, awaiting to be displayed) which will be displayed within the graphical user interface 150. In this manner, when the resource manager 121 is to display a representation of an object 302 out of its home context and its simple name 304 is not unique, the representation will include both the simple name of the object 304 as well as the home of the object 305.

If after processing either step 473 and possibly step 474 and then also possibly step 475, processing proceeds to step 476.

In step 476, the resource manager 121 determines if the home of the object 305 is unique within the entire object hierarchy 301. In other words, in step 476, the resource manager 121 determines if there is another object 302 in the resource hierarchy 301 that is considered a home to another object and that has the same simple name as the name of the home 305 of the object 302 being processed according to the step in FIG. 7. For example, a data storage system represented by a home object 302 having a simple name which is the same as a simple name of a host or of a network device represented by another object 302 creates a situation in which two resources are both homes to other resources and each has the same simple name 304. In such circumstances, since each resource is a home to other resources and has the same simple name, then a home exists that is not unique for objects below those resources in the object hierarchy 301 in the sense that two homes for other resources exist with the same simple name. In such instances, the processing of the resource manager 121 proceeds to step 477 for application of a suffix to the home of the object 305 being processed in the loop 471. As noted above, the suffix (when displayed on the graphical user interface) indicates to the user 108 that there is at least two home resources having the same name.

In step 477, the resource manager 121 appends a suffix to the home of the object 305 and includes the home of the object 305 in the representation of the object being created according to the processing of the loop 471. The suffix can be any character string, symbol or other designation that can indicate to a user that this home is not unique in the computing system environment 100.

After processing steps 476 and possibly 477 (if the suffix is required), processing proceeds to step 478 at which point the resource manager 121 displays a representation of the object 302 in a graphical user interface 150 in a location corresponding to the object location within the object hierarchy 301. In this manner, the object 302 is visually represented on the graphical user interface 150.

Processing then returns to step 472 at which point the resource manager 121 traverses the tree to process and display a representation of the next object 302 in the object hierarchy 301 for display within the graphical user interface 150. Using these techniques, embodiments of the invention are able to properly represent objects with a graphical user interface using the unique naming and grouping techniques explained herein.

Those skilled in the art will understand that there can be many other variations made to the operations of the embodiments explained above while still achieving the same objectives of the invention. Such variations are intended to be covered by the scope of this invention. As such, the foregoing description of embodiments of the invention are not intended to be limiting. Rather, any limitations to embodiments of the invention are presented in the following claims.

What is claimed is:

1. A method for representing a resource in a computing system environment, the method comprising the steps of:
   creating an object to represent a resource in the computing system environment, the object being created in a manner associating the object with at least one location within an object hierarchy such that the object becomes a child object of at least one parent object in object hierarchy, the object hierarchy representing relationships between resources in the computing system environment which are represented by objects in object hierarchy, the at least one location with which the object is associated including a home location identifying a home object in object hierarchy under which the object is initially associated as a child object, so as to define a home context for the object;
   receiving a simple name for the object to uniquely identify that object;
   assigning an object identifier to the object, the object identifier including at least the simple name of the object and a home of the object, the home of the object being assigned as the home location identifying the home object for the object in object hierarchy;
   assigning a suffix to the home of the object if the home of the object is not unique in the computing system environment, such that object identifiers for objects having a home that is not unique will be different from each other based on the suffix;
   displaying at least one representation of the object on a graphical user interface, each of the at least one representation of the object including the simple name of the object;
   determining whether a home condition exists for one of the at least one representation of the object displayed on the graphical user interface;
   if a home condition exists for one of the at least one representation of the object displayed on the graphical user interface, including the home and assigned suffix of the object in the representation of the one of the at least one representation of the object displayed on the graphical user interface, and if a home condition does not exist, omitting the home and suffix of the object from the representation of the one of the at least one representation of the object displayed on the graphical user interface.

2. The method of claim 1 wherein the home location to which the object is associated is a simple name included in an object identifier assigned to the home object associated with that home location, such that if a home condition exists, the at least one representation of the object displayed on the graphical user interface includes the simple name of the object followed by the simple name of the home object associated with the home location of the object.

3. The method of claim 1 wherein the step of a displaying at least one representation of the object on a graphical user interface comprises the step of:
   displaying the object hierarchy on the graphical user interface to convey the relationships between resources in the computing system environment, such that certain of the at least one location of the object in the object hierarchy is displayed on the graphical user interface; and
   wherein a home condition exists for one of the at least one representation of the object displayed on the graphical user interface if displaying that representation of the object at that location in the object hierarchy in the graphical user interface causes one of:
   i) the object to be displayed out of a home context of the object; and
   ii) the object to be displayed non-uniquely in a context in which the object is displayed;
   such that the occurrence of a home condition causes the one of the at least one representation of the object to be displayed in a qualified manner in that location in the object hierarchy in the graphical user interface.

4. The method of claim 1 wherein a home condition exists if a user of the graphical user interface indicates that representations of objects are to be displayed on the graphical user interface in a qualified manner, such that the at least one representation of the object displayed on the graphical user interface in a qualified manner includes the simple name of the object followed by the home of the object.

5. The method of claim 1 wherein the home object in the object hierarchy, for which the home location is identified by the home of the object, is a first non-transparent ancestral home object in the object hierarchy.

6. The method of claim 1 wherein the object is a group object created to represent a plurality of related resources in the computing system environment, such that objects in the object hierarchy below the group object share a common relationship to each other identified by the group object.

7. A method for representing a resource in a computing system environment, the method comprising the steps of:
   creating an object to represent a resource in the computing system environment, the object being created in a manner associating the object with at least one location within an object hierarchy such that the object becomes a child object of at least one parent object in the object hierarchy, the object hierarchy representing relationships between resources in the computing system environment which are represented by objects in the object hierarchy, the at least one location with which the object is associated including a home location identifying a home object in the object hierarchy under which the object is initially associated as a child object, so as to define a home context for the object, the object being a group object created to represent a plurality of related resources in the computing system environment, such that objects in the object hierarchy below the group object share a common relationship to each other identified by the group object, the group object being a transparent group object having a home identified by a home location of a first non-transparent ancestral home object in the object hierarchy under which the transparent group object is initially associated as a descendent child object;

assigning an object identifier to the object, the object identifier including at least a simple name of the object and a home of the object, the home of the object being assigned as the home location identifying the home object for the object in the object hierarchy;

displaying at least one representation of the object on a graphical user interface, each of the at least one representation of the object including the simple name of the object;

determining whether a home condition exists for one of the at least one representation of the object displayed on the graphical user interface; and if a home condition exists for one of the at least one representation of the object displayed on the graphical user interface, including the home of the object in the representation of the one of the at least one representation of the object displayed on the graphical user interface, and if a home condition does not exist, omitting the home of the object from the representation of the one of the at least one representation of the object displayed on the graphical user interface;

wherein objects subsequently created as child objects of the transparent group object each have a respective home identified by the home location of the first non-transparent ancestral home object in object hierarchy under which the transparent group object is initially associated as a descendent child object.

8. A method for representing a resource in a computing system environment, the method comprising the steps of:

creating an object to represent a resource in the computing system environment, the object being created in a manner associating the object with at least one location within an object hierarchy such that the object becomes a child object of at least one parent object in the object hierarchy, the object hierarchy representing relationships between resources in the computing system environment which are represented by objects in the object hierarchy, the at least one location with which the object is associated including a home location identifying a home object in the object hierarchy under which the object is initially associated as a child object, so as to define a home context for the object, the object being a group object created to represent a plurality of related resources in the computing system environment, such that objects in the object hierarchy below the group object share a common relationship to each other identified by the group object, the group object being a terminal group object having a home identified by a home location of a home object in object hierarchy under which the terminal group object is initially associated as a child object; and assigning an object identifier to the object, the object identifier including at least a simple name of the object and the home of the object, the home of the object being assigned as the home location identifying the home object for the object in the object hierarchy;

displaying at least one representation of the object on a graphical user interface, each of the at least one representation of the object including the simple name of the object;

determining whether a home condition exists for one of the at least one representation of the object displayed on the graphical user interface; and if a home condition exists for one of the at least one representation of the object displayed on the graphical user interface, including the home of the object in the representation of the one of the at least one representation of the object displayed on the graphical user interface, and if a home condition does not exist, omitting the home of the object from the representation of the one of the at least one representation of the object displayed on the graphical user interface;

wherein objects subsequently created as child objects of the terminal group object each have a respective home identified by the home location of the home object in object hierarchy under which the terminal group object is initially associated as a child object.

9. The method of claim 1 wherein there are a plurality of objects represented in the object hierarchy and wherein the relationships between objects represented in the object hierarchy include functional relationships and organizational relationships between certain of the objects represented in the object hierarchy; and wherein the step of a displaying at least one representation of the object on a graphical user interface includes the step of displaying the object hierarchy on the graphical user interface to convey the functional and organizational relationships between resources in the computing system environment.

10. The method of claim 9 wherein:

the plurality of objects represented in the object hierarchy represent resources in the computing system environment including storage system resources, computing system resources, and storage area network resources;

wherein a user of the graphical user interface can manage resources associated with object in the object hierarchy via selection of representations of objects in the object hierarchy displayed on the graphical user interface; and wherein all objects containing a representation in the graphical user interface have a simple name and a home that combine to define a single name space for all objects in the computing system environment irrespective of what those objects represent.

11. The method of claim 1 wherein there are multiple representations of the same object within the object hierarchy and wherein representations of the object that appear in the graphical user interface in a non-home context are displayed in the graphical user interface in a fully qualified manner so as to indicate the simple name of the object followed by the home of the object.

12. The method of claim 1 further including the steps of:

moving the object to a new home location in the object hierarchy such that the object has a new home context; and determining if the simple name for the object uniquely identifies the object in the new home context for the object with respect to other object having the same home context, and if the simple name for the object does not uniquely identify the object in the new home context for the object, altering the simple name to provide a unique simple name for the object in the new home context.

13. The method of claim 12 wherein the step of altering comprises appending a suffix to the end of the simple name of the object such that the simple name uniquely identifies the object in the new home context.

14. The method of claim 1 wherein the object can be represented in a fully qualified manner to indicate a specific instance of the resource associated with that object by representing the object with the simple name of the object followed by the home of the object.

15. A computer system, comprising:
a display;
a memory system;
a processor; and
an interconnection mechanism connecting the display, the processor and the memory system;
wherein the memory system is encoded with a resource management application that when performed on the processor, produces a resource management process that includes a graphical user interface for representing a resource in a computing system environment on the display of the computer system, the resource management process causing the computer system to perform the operations of;
creating an object in the memory system to represent a resource in the computing system environment, the object being created in a manner associating the object with at least one location within an object hierarchy in the memory system such that the object becomes a child object of at least one parent object in the object hierarchy, the object hierarchy representing relationships between resources in the computing system environment which are represented by objects in the object hierarchy in the memory system, the at least one location with which the object is associated including a home location identifying a home object in object hierarchy under which the object is initially associated as a child object, so as to define a home context for the object;
receiving a simple name for the object to uniquely identify that object; and
assigning an object identifier to the object in the memory system, the object identifier including at least a simple name of the object and a home of the object;
assigning a suffix to the home of the object if the home of the object is not unique in the computing system environment, such that object identifiers for objects having a home that is not unique will be different from each other based on the suffix;
displaying at least one representation of the object on the graphical user interface on the display of the computer system, each of the at least one representation of the object including the simple name of the object;
determining whether a home condition exists for one of the at least one representation of the object displayed on the graphical user interface; and
if a home condition exists for one of the at least one representation of the object displayed on the graphical user interface, including the home and suffix of the object in the representation of the one of the at least one representation of the object further displayed on the graphical user interface, and if a home condition does not exist, omitting the home and suffix of the object from the representation of the one of the at least one representation of the object displayed on the graphical user interface.

16. The computer system of claim 15 wherein the home location to which the object is associated is a simple name included in an object identifier assigned to the home object associated with that home location, such that if a home condition exists, the at least one representation of the object displayed on the graphical user interface includes the simple name of the object followed by the simple name of the home object associated with the home location of the object.

17. The computer system of claim 15 wherein when the resource management process causes the computer system to perform the operation of displaying at least one representation of the object on a graphical user interface, the resource management process causes the computer system to perform the operations of:
displaying the object hierarchy on the graphical user interface to convey the relationships between resources in the computing system environment, such that certain of the at least one location of the object in the object hierarchy is displayed on the graphical user interface; and
wherein a home condition exists for one of the at least one representation of the object displayed on the graphical user interface if displaying that representation of the object at that location in the object hierarchy in the graphical user interface causes one of:
i) the object to be displayed out of a home context of the object; and
ii) the object to be displayed non-uniquely in a context in which the object is displayed;
such that the occurrence of a home condition causes the one of the at least one representation of the object to be displayed in a qualified manner in that location in the object hierarchy in the graphical user interface.

18. The computer system of claim 15 wherein a home condition exists if a user of the graphical user interface indicates that representations of objects are to be displayed on the graphical user interface in a qualified manner, such that the at least one representation of the object displayed on the graphical user interface in a qualified manner includes the simple name of the object followed by the home of the object.

19. The computer system of claim 15 wherein the home object in the object hierarchy in the memory system, for which the home location is identified by the home of the object, is a first non-transparent ancestral home object in the object hierarchy.

20. The computer system of claim 15 wherein the object is a group object in the memory system created to represent a plurality of related resources in the computing system environment, such that objects in the object hierarchy below the group object share a common relationship to each other identified by the group object.

21. A computer system, comprising:
a display;
a memory system;
a processor; and
an interconnection mechanism connecting the display, the processor and the memory system;
wherein the memory system is encoded with a resource management application that when performed on the processor, produces a resource management process that includes a graphical user interface for representing a resource in a computing system environment on the display of the computer system, the resource management process causing the computer system to perform the operations of:
creating an object in the memory system to represent a resource in the computing system environment, the object being created in a manner associating the object with at least one location within an object hierarchy in the memory system such that the object becomes a child object of at least one parent object in the object hierarchy, the object hierarchy representing relationships between resources in the computing system environment which are represented by objects in the object hierarchy in the memory system, the at least one location with which the object is associated including a home location identifying a home object in object hierarchy under which the object is initially associated as a child object, so as to define a home context for the object, the group object being a transparent group object having a home identified by a home location of a first non-transparent ancestral home object in object hierarchy under which the transparent group object is initially associated as a descendent child object;

assigning an object identifier to the object in the memory system, the object identifier including at least a simple name of the object and a home of the object;

displaying at least one representation of the object on the graphical user interface on the display of the computer system, each of the at least one representation of the object including the simple name of the object;

determining whether a home condition exists for one of the at least one representation of the object displayed on the graphical user interface; and if a home condition exists for one of the at least one representation of the object displayed on the graphical user interface, including the home of the object in the representation of the one of the at least one representation of the object further displayed on the graphical user interface, and if a home condition does not exist, omitting the home of the object from the representation of the one of the at least one representation of the object displayed on the graphical user interface; and wherein objects subsequently created as child objects of the transparent group object each have a respective home identified by the home location of the first non-transparent ancestral home object in object hierarchy under which the transparent group object is initially associated as a descendent child object.

22. A computer system, comprising:

a display;

a memory system;

a processor; and an interconnection mechanism connecting the display, the processor and the memory system;

wherein the memory system is encoded with a resource management application that when performed on the processor, produces a resource management process that includes a graphical user interface for representing a resource in a computing system environment on the display of the computer system, the resource management process causing the computer system to perform the operations of:

creating an object in the memory system to represent a resource in the computing system environment, the object being created in a manner associating the object with at least one location within an object hierarchy in the memory system such that the object becomes a child object of at least one parent object in the object hierarchy, the object hierarchy representing relationships between resources in the computing system environment which are represented by objects in the object hierarchy in the memory system, the at least one location with which the object is associated including a home location identifying a home object in object hierarchy under which the object is initially associated as a child object, so as to define a home context for the object—the group object being a terminal group object having a home identified by a home location of a home object in object hierarchy under which the terminal group object is initially associated as a child object;

assigning an object identifier to the object in the memory system, the object identifier including at least a simple name of the object and a home of the object;

displaying at least one representation of the object on the graphical user interface on the display of the computer system, each of the at least one representation of the object including the simple name of the object;

determining whether a home condition exists for one of the at least one representation of the object displayed on the graphical user interface; and if a home condition exists for one of the at least one representation of the object displayed on the graphical user interface, including the home of the object in the representation of the one of the at least one representation of the object further displayed on the graphical user interface, and if a home condition does not exist, omitting the home of the object from the representation of the one of the at least one representation of the object displayed on the graphical user interface;

wherein objects subsequently created as child objects of the terminal group object each have a respective home identified by the home location of the home object in object hierarchy under which the terminal group object is initially associated as a child object.

23. The computer system of claim 15 wherein there are a plurality of objects represented in the object hierarchy and wherein the relationships between objects represented in the object hierarchy include functional relationships and organizational relationships between certain of the objects represented in the object hierarchy; and wherein when the resource management process causes the computer system to perform the operation of displaying at least one representation of the object on a graphical user interface, the resource management process causes the computer system to perform the operation of displaying the object hierarchy on the graphical user interface to convey the functional and organizational relationships between resources in the computing system environment.

24. The computer system of claim 23 wherein:

the plurality of objects represented in the object hierarchy represent resources in the computing system environment including storage system resources, computing system resources, and storage area network resources coupled to the computer system and operating in communication with the resource management process via a network interface;

wherein a user of the graphical user interface can manage resources associated with object in the object hierarchy via selection of representations of objects in the object hierarchy displayed on the graphical user interface; and wherein all objects containing a representation in the graphical user interface have a simple name and a home that combine to define a single name space for all objects in the computing system environment irrespective of what those objects represent.

25. The computer system of claim 15 wherein there are multiple representations of the same object within the object hierarchy in the memory system and on the graphical user interface and wherein representations of the object that appear in a non-home context in the graphical user interface are displayed in the graphical user interface in a fully qualified manner so as to indicate the simple name of the object followed by the home of the object.

26. The computer system of claim 15 wherein the resource management process further causes the computer system to perform the operations of:

moving the object to a new home location in the object hierarchy such that the object has a new home context; and determining if the simple name for the object uniquely identifies the object in the new home context for the object with respect to other object having the same home context, and if the simple name for the object does not uniquely identify the object in the new home context for the object, altering the simple name to provide a unique simple name for the object in the new home context.

27. The computer system of claim 26 wherein when the resource management process causes the computer system to perform the operation of altering, the resource management process causes the computer system to perform the operation of appending a suffix to the end of the simple name of the object such that the simple name uniquely identifies the object in the new home context.

28. The computer system of claim 15 wherein the object can be represented on the graphical user interface in a fully qualified manner to indicate a specific instance of the resource associated with that object by representing the object with the simple name of the object followed by the home of the object.

29. A computer program product having a computer-readable medium including computer program logic encoded thereon that, when executed on a computer system having a coupling of a memory system, a processor, and a display that displays a graphical user interface, the computer program logic is executed on the processor, and the computer program logic provides a method for representing resource in a computing system environment by causing the processor to perform the operations of:

creating an object in the memory system to represent a resource in the computing system environment, the object being created in a manner associating the object with at least one location within an object hierarchy in the memory system such that the object becomes a child object of at least one parent object in the object hierarchy, the object hierarchy representing relationships between resources in the computing system environment which are represented by objects in the object hierarchy in the memory system, the at least one location to which the object is associated in the object hierarchy including a home location identifying a home object in object hierarchy under which the object is initially associated as a child object so as to define a home context for the object;

receiving a simple name for the object to uniquely identify that object assigning an object identifier to the object in the memory system, the object identifier including at least the simple name of the object and a home of the object, the object identifier being assigned such that the home of the object is the home location identifying the home object for that object in object hierarchy assigning a suffix to the home of the object if the home of the object is not unique in the computing system environment, such that object identifiers for objects having a home that is not unique will be different from each other based on the suffix;

displaying at least one representation of the object on the graphical user interface on the display of the computer system, each of the at least one representation of the object including the simple name of the object;

determining whether a home condition exists for one of the at least one representation of the object displayed on the graphical user interface; and if a home condition exists for one of the at least one representation of the object displayed on the graphical user interface, including the home and suffix of the object in the representation of the one of the at least one representation of the object displayed on the graphical user interface, and if a home condition does not exist, omitting the home and suffix of the object from the representation of the one of the at least one representation of the object displayed on the graphical user interface.

30. A computer system, comprising:

a display;

a memory system;

a processor; and an interconnection mechanism connecting the display, the processor and the memory system;

wherein the memory system is encoded with a resource management application that when performed on the processor, produces a resource management process that includes a graphical user interface for representing a resource in a computing system environment on the display of the computer system, the resource management process configuring the computer system with:

means for creating an object in the memory system to represent a resource in the computing system environment, the object being created so as to be associated with at least one location within an object hierarchy in the memory system such that the object becomes a child object of at least one parent object in the object hierarchy, the object hierarchy representing relationships between resources in the computing system environment which are represented by objects in the object hierarchy in the memory system, the at least one location to which the object is associated in the object hierarchy including a home location identifying a home object in object hierarchy under which the object is initially associated as a child object, so as to define a home context for the object;

means for receiving a simple name for the object to uniquely identify that object;

means for assigning an object identifier to the object in the memory system, the object identifier including at least a simple name of the object and a home of the object, the object identifier being assigned such that the home of the object is the home location identifying the home object for that object in object hierarchy;

means for assigning a suffix to the home of the object if the home of the object is not unique in the computing system environment, such that object identifiers for objects having a home that is not unique will be different from each other based on the suffix;

means for displaying at least one representation of the object on the graphical user interface on the display of the computer system, each of the at least one representation of the object including the simple name of the object;

determining whether a home condition exists for one of the at least one representation of the object displayed on the graphical user interface; and if a home condition exists for one of the at least one representation of the object displayed on the graphical user interface, including the home and suffix of the object in the representation of the one of the at least one representation of the object displayed on the graphical user interface, and if a home condition does not exist, omitting the home and suffix of the object from the representation of the one of the at least one representation of the object displayed on the graphical user interface.

* * * * *